(12) United States Patent
Jahn et al.

(10) Patent No.: US 7,671,336 B2
(45) Date of Patent: Mar. 2, 2010

(54) METHOD FOR SOIL CONTENT PREDICTION BASED ON A LIMITED NUMBER OF MID-INFRARED ABSORBANCES

(75) Inventors: Bernard Jahn, Davis, CA (US); Shrini Upadhyaya, Davis, CA (US); David Slaughter, Davis, CA (US)

(73) Assignee: The Regents of the University of California, Oakland, CA (US)

( * ) Notice: Subject to any disclaimer, the term of this patent is extended or adjusted under 35 U.S.C. 154(b) by 665 days.

(21) Appl. No.: 11/531,823

(22) Filed: Sep. 14, 2006

(65) Prior Publication Data

US 2007/0073491 A1   Mar. 29, 2007

Related U.S. Application Data

(60) Provisional application No. 60/717,258, filed on Sep. 14, 2005.

(51) Int. Cl.
*G01V 7/00* (2006.01)
(52) U.S. Cl. .................................. 250/339.11

(58) Field of Classification Search ............. 250/339.11
See application file for complete search history.

(56) References Cited

OTHER PUBLICATIONS

B.R. Jahn, S.K. Upadhyaya, P. Brooksby, D. Verbovyy, "Analysis of Soil FTIR/ATR Spectral Data using Wavelet Analysis to Determine Soil Nitrate Content." Paper No. 041043 written for presentation at the 2004 ASAE/CSAE Annual International Meeting, Fairmont Chateau Laurier, The Westin, Government Centre, Ottawa, Ontario, Canada, Aug. 1-4, 2004, downloaded Apr. 22, 2009 from <http://chemgroups.ucdavis.edu/~fawcett/Publications Group 2007/Bernard J + Verbovyy/Analys of Solil Nitrate.htm>.*

* cited by examiner

*Primary Examiner*—Constantine Hannaher
(74) *Attorney, Agent, or Firm*—John P. O'Banion

(57) ABSTRACT

A single absorbance value was found in the mid infrared (mid-IR) region that correlated directly to soil nitrate content while not being influenced by other components in the soil, such as carbonate and organic matter. Using one or two absorbance values, at which interference from other ions is a minimum, to predict a component's concentration as opposed to the conventional method of using a continuous spectrum allows for an in-situ real-time soil nitrate content sensor.

18 Claims, 13 Drawing Sheets

METHOD FOR SOIL CONTENT PREDICTION BASED ON A LIMITED NUMBER OF MID-INFRARED ABSORBANCES

CROSS-REFERENCE TO RELATED APPLICATIONS

This application claims priority from U.S. provisional application Ser. No. 60/717,258 filed on Sep. 14, 2005, incorporated herein by reference in its entirety.

STATEMENT REGARDING FEDERALLY SPONSORED RESEARCH OR DEVELOPMENT

This invention was made with Government support under Grant No. BARD US-3293-20c, awarded by the US-Israel Binational Research and Development Fund. The Government may have certain rights in this invention.

INCORPORATION-BY-REFERENCE OF MATERIAL SUBMITTED ON A COMPACT DISC

Not Applicable

BACKGROUND OF THE INVENTION

1. Field of the Invention

This invention pertains generally to in-situ detection of soil properties, and more particularly to in-situ detection of soil properties with FTIR/ATR spectroscopy.

2. Description of Related Art

Precision farming, a technique which involves managing agricultural inputs and outputs on a site-specific basis, has received much attention over the last decade due to its potential to decrease inputs, such as fertilizer costs, and to increase yields. This technique attempts to use all available information across the field, such as nutrient levels, moisture contents, pH, texture, etc., to manage nutrients on a site-specific basis.

Site-specific crop management (SSCM) is based on a system-engineering approach to crop production where inputs are applied on an "as needed basis", which is made possible by recent innovations in information and technology such as microcomputers, geographic information systems, positioning technologies (Global Positioning System, GPS), and automatic control of farm machinery (Robert et al., 1994). SSCM combined with variable-rate application (VRA) allows one to apply the right amount of fertilizer at the correct location in the field. Experiments conducted at the University of Idaho showed that reductions in fertilizer application amounts of 25% due to variable rate application were obtained with no decrease in yield potential (Fisher et al., 1993). Farmers typically apply uniform fertilizer amounts in excess of what the crops need to prevent yield loss due to nutrient deficiency. Applying lower fertilizer amounts to areas within a field of limited yield potential can lead to savings in fertilizer costs as well as reduced leaching of nitrate into the groundwater.

One of the main obstacles to implementing precision farming techniques is the absence of accurate and easy-to-use soil sensors to gather information about a field.

One of the main obstacles to implementing precision farming techniques is the absence of inexpensive yet accurate methods of gathering information about a field. Soil properties such as nitrogen and moisture levels vary significantly over a growing season and need to be monitored frequently in order to create accurate management maps. There are several methods of obtaining information about a field. These include aerial photographs, satellite imagery, soil electrical conductivity sensors, yield maps, and intensive soil survey data (Franzen and Cihacek, 1998). Soil survey data allow for the most complete representation of a field. However, this method requires significant amounts of time and labor. Due to the interaction of soil properties, extensive soil sampling is often required in order to obtain an accurate representation of the field at a given point in time. Soil components differ in chemical characteristics; further complicating field studies. Nitrate is a highly mobile ion and easily leaches from the soil when moisture is applied. In contrast, soil pH, phosphorus and organic matter levels tend to be more stable with time and do not require such frequent sampling. There are commercial electrical resistance/conductivity sensors currently available for in-situ measurements of soil pH but none are available for accurate determination of soil nitrate, phosphorus, or organic matter concentrations.

Nitrogen is an important nutrient for crop production. Together with water and sunlight, nitrogen is one of the key ingredients for plant growth. Nitrate is believed to be the preeminent form of nitrogen available to plants (Adsett and Zoerb, 1991). As stated earlier, nitrate, which is an anion, moves with the waterfront through the soil and is therefore susceptible to leaching. Denitrification is the conversion of nitrate to a gaseous form that is lost to the environment. This process occurs in soils with warm temperatures, moist conditions, and a near neutral pH. There are two major sources of nitrogen in agricultural fields: animal manure and inorganic fertilizers. These two sources account for the majority of the nitrogen in fields and consequently lead to leaching problems. Weather plays an important role in the timing of fertilizer application. Large amounts of fertilizer are usually applied when fields are dry enough to allow machinery traffic. Due to the complex behavior of the nitrate molecule, nitrate losses are inevitable with this method. Applying nitrogen fertilizer on an "as needed" basis rather than using a single application has both environmental and economic benefits (Francis and Piekielek, 2004).

Knowing the nitrate variability across a field could allow one to apply the site-specific amount of fertilizer for the given area and prevent over-applying, which can lead to nitrate leaching into groundwater resulting in health problems such as "blue-baby" syndrome and stomach cancer as well as environmental issues like algal bloom and greenhouse effect due to $N_2O$. Site-specific-crop-management (SSCM) combined with variable-rate application allows one to apply the right amount of fertilizer at the correct location in the field.

In addition to nitrogen, phosphorus is also an essential nutrient for plant growth. Measuring phosphorus in soils is not an easy task. The soluble fraction of phosphorus in soils is usually very low, often estimated to be on the order of 0.1 ppm or less (S. Pettygrove, personal communication, 11 Nov. 2005). For this reason, soluble phosphorus is not a very reliable indicator of plant-available phosphorus. As in most soil nutrient analyses, soil pH is very important for the determination of phosphorus concentration. In alkaline conditions, with pH above approximately 7.5, phosphorus forms insoluble carbonates. In acidic conditions, with pH below 6 or so, phosphate will be sorbed onto iron, aluminum, and manganese oxide surfaces to form precipitates. Phosphorus just does not remain in solution for long in soils.

The desired method of soil phosphorus analysis depends on the pH of the soil. For acidic conditions, the Bray method (Diamond, 1995) is used to determine PO4-P amounts. This involves extracting the PO4-P using a dilute acid fluoride solution. For alkaline conditions, the Olsen-P method (Olsen, 1982) is commonly used. This test uses 0.5 normal NaHCO3 as the extracting agent and allows for measurement of plant available phosphate in the 0 to 50 ppm PO4-P range. Modified methods are available to extend this range up to 200 ppm (Everett, 2005).

The third important component characterizing a soil condition is its organic matter content. Organic matter levels in soils are usually determined by measuring organic carbon amounts. This may be accomplished by burning the soil in a furnace or by wet chemistry techniques, both of which are not suited for in-situ measurement of organic matter. As with nitrogen and phosphorus, organic matter exists in different forms. When organic matter decomposes for some period of time, it forms a dark brown, spongy material called humus. Humus, in particular humic acid, provides many benefits to crop production, such as aiding in breaking down compacted soil particles, transferring micronutrients from the soil to the plant, and stimulating the development of microflora populations in soils (Bio Ag Technologies, 1999). Because of its negative charge due to its oxidized sites, humic acid is important for absorbing micronutrients.

Most researchers in the precision farming area are familiar with the attempts to develop techniques for measuring these three soil components (nitrogen, phosphorus, and organic matter) using near infrared (NIR) spectroscopy due to the availability of inexpensive instruments for this region of the electromagnetic spectrum. Typically, the near infrared spectra collected are related to concentrations through a data-processing technique such as multiple linear regression, partial least squares regression, principal components regression, or neural networks.

In most cases, the results are similar: the predictive ability of the model decreases significantly when applied to areas outside the calibration region. In other words, as soon as another component which wasn't in the calibration set affects the spectra, the ability of the calibration equation to predict a certain specie's concentration falls apart. A model is only as good as the original data used to define it, so no matter which transformations (partial least squares or principal components) are performed on near infrared spectra, the robustness of the model is always a concern. The primary reason for this lack of robustness is due to the absence of absorbance (or reflectance) peaks due to nitrate (or phosphorus or organic matter) that exist in the near infrared region. Unlike the mid-infrared region where fundamental vibration modes of molecules exist, the near infrared region contains much weaker peaks due to overtones and combinations of vibrational modes.

Recently, Fourier Transform Infrared (FTIR) Attenuated Total Reflection (ATR) spectroscopy has shown great promise for detecting low concentrations of nitrate. The FTIR/ATR technique applied to mid-infrared (mid-IR) spectra has advantages in terms of minimal sample preparation needed even for low nitrate contents (<10 ppm $NO_3$—N) and increased sensitivity of nitrate peaks due to the fundamental modes of vibration of the nitrate molecule that occur in this region.

Linker et al. (2004) attempted to use principal component regression (PCR), partial least squares (PLS), and cross-correlation to predict nitrate contents in FTIR/ATR spectra of soil pastes. (Linker, R., A. Kenny, A. Shaviv, L. Singher, and I. Shmulevich. 2004. Fourier Transform Infrared-Attenuated Total Reflection Nitrate Determination of Soil Solutions Using Principal Component Regression, Partial Least Squares, and Cross-Correlation. *Applied Spectroscopy* 58(5): 516-520, herein incorporated by reference in its entirety).

Linker et al. experimented with eight soils ranging in $NO_3$—N concentration from 0 to 1000 ppm. Three of the soils were calcareous soils, containing large amounts of carbonate. When three calcareous soils were not included, they obtained the best results using PLS (4 components, standard error of 32 ppm $NO_3$—N), followed by PCR (7 components, 32 ppm $NO_3$—N), and the worst results with cross correlation with reference libraries (using 6 spectra, 35 ppm $NO_3$—N). When calcareous soils were included in the analysis, the standard errors increased approximately two-fold.

BRIEF SUMMARY OF THE INVENTION

In order to overcome deficiencies in prior approaches and to provide for more reliable and accurate determination of soil nitrate content, the present invention employs wavelet analysis and an alternative technique that uses absorbance responses at a few selected wavenumbers to determine the component composition of the soil (e.g. nitrate, phosphorus and/or organic matter contents). To verify accuracy and reliability of the present invention, the technique was applied to the same soil spectra as described above. According to an aspect of the invention, a single absorbance value was found in the mid infrared (mid-IR) region that correlated directly to soil nitrate content while not being influenced by other components in the soil, such as carbonate and organic matter. A signal analysis tool called wavelet analysis was used to locate a wavenumber where the absorbance could be attributed to nitrate content alone. Existence of such a wavelength that is a signature of nitrate ion is highly beneficial in developing a nitrate sensor with a unique calibration curve.

Experiments were conducted that involved adding nitrate to various soil types both in the laboratory and field. In a first experiment, soil pastes from ten different soils, including sandy loam, clay, and peat soils, were analyzed for soil nitrate contents using the Fourier Transform Infrared (FTIR) Attenuated Total Reflection (ATR) technique. Three of the soil types were known to be calcareous, containing large carbonate amounts. Nitrate concentrations for the laboratory experiments varied from approximately 0 to 1000 ppm $NO_3$—N while concentrations for the field experiments varied from approximately 0 to 100 ppm $NO_3$—N. Wavelet analysis was applied to the spectra obtained from the soil pastes in order to allow for calibration equations to be developed to predict nitrate concentrations. Three-dimensional plots were created by graphing the wavelet deconvoluted values at 32 scales for each sample. From each plot, the volume of the nitrate peak was determined. Calibration equations were developed by correlating the volume of these peaks to nitrate concentrations. Results of the laboratory experiments indicated $R^2$-values as high as 0.99 and standard errors as low as 24 ppm $NO_3$—N. Results of the field experiments gave $R^2$-values as high as 0.98 and standard errors as low as 5 ppm $NO_3$—N. In both cases, the slopes of the calibration equations depended on the soil types, indicating site specific calibration may be needed.

An alternative technique to detect nitrate was developed in which wavelet analysis was used to identify a few wavenumbers at which interferences from other ions were a minimum. This method led to calibration equations that were soil independent and gave superior results to those obtained based on correlating wavelet deconvoluted volumes to nitrate concentrations. Also, these calibration equations allowed for the calcareous soils to be pooled with the noncalcareous soils for predicting nitrate concentrations.

One aspect of the invention is method for determining concentration of a constituent or component in a soil sample.

The method includes obtaining mid-infrared attenuated total reflectance spectra of the soil sample, and identifying a single mid-infrared range absorbance value. The mid-infrared range absorbance value corresponds to a decomposed peak volume of said component. Finally, the concentration of the component (e.g. nitrate, phosphorus, organic matter) in the soil sample is determined by correlating the absorbance value with a predicted component concentration value.

The absorbance value generally comprises a wavenumber corresponding to a decomposed nitrate peak in the soil. In one embodiment, the decomposed nitrate peak is generated from wavelet analysis of the reflectance spectra.

In another embodiment, correlating the absorbance value comprises inputting the absorbance value into a single calibration equation. The calibration equation may be generated by obtaining mid-infrared attenuated total reflectance spectra data of one or more soil samples, separating the nitrate peak from a carbonate peak in the soil spectra, and identifying a first wavenumber corresponding to the location of the nitrate peak. A wavelet analysis may be used to separate the nitrate peak from the carbonate peak. In many embodiments, the reflectance spectra data is baseline corrected prior to analysis.

Generating the calibration equation may further include identifying a second wavenumber to account for and substantially eliminate influence of the carbonate peak. The second wavenumber corresponds to a second absorbance value relating primarily to carbonate presence in the soil, the second absorbance value being substantially free of influence by carbonate or other soil components. A small number of additional wavelengths may also be used (e.g. for a total of four). Wavelengths ranging from approximately 900 $cm^{-1}$ to approximately 1550 $cm^{-1}$ were used to detect nitrate composition.

In one embodiment the wavenumbers range from approximately 1300 to 1350 $cm^{-1}$. In another embodiment, the first wavenumber comprises approximately 1350 $cm^{-1}$, and the second wavenumber comprises approximately 1500 $cm^{-1}$.

Preferably, the correlation equation is independent of soil type, such that it is capable of being applied universally.

Another aspect of the invention is a method of correlating FTIR ATR soil spectra to a nitrate concentration. The method includes obtaining FTIR ATR soil spectra from a plurality of soil samples of different soil types, and pooling absorbance data from one or more selected wavelengths of each sample into a calibration equation.

In one embodiment, pooling absorbance data is achieved by analyzing the soil spectra to separate a nitrate peak from a carbonate peak, and identifying a wavenumber at the nitrate peak and calculating a volume of the nitrate peak. A wavelet analysis may be performed to separate the nitrate peak from the carbonate peak.

In one embodiment, the selected wavelengths comprise a value between approximately 1300 $cm^{-1}$ and approximately 1550 $cm^{-1}$. For example, a first selected wavelength may be approximately 1500 $cm^{-1}$, and a second selected wavelength may be approximately 1500 $cm^{-1}$.

Yet another aspect is method for determining the concentration of a component in a soil sample, comprising obtaining mid-infrared attenuated total reflectance spectra of the soil sample, correlating a plurality of mid-infrared range absorbance values with a component concentration in soil, and determining component concentration from said absorbance values, wherein said absorbance values do not form a continuous spectrum.

For example, where the component comprises nitrate, and wherein one of the mid-infrared range absorbance values corresponds to a decomposed peak volume of nitrate. In one embodiment absorbance value for nitrate comprises a value between approximately 1300 $cm^{-1}$ and approximately 1550 $cm^{-1}$ In an alternative embodiment, the component comprises phosphorus, and one of the mid-infrared range absorbance values corresponds to a decomposed peak volume of phosphorus. In one embodiment absorbance value for phosphorus comprises a value between approximately 1000 $cm^{-1}$ and approximately 1550 $cm^{-1}$, and more particularly 1037 $cm^{-1}$ and approximately 1508 $cm^{-1}$.

In yet another embodiment, the component comprises organic matter, and wherein one of the mid-infrared range absorbance values corresponds to a decomposed peak volume of organic matter. For example, the absorbance value for organic matter may comprise a value between approximately 1383 $cm^{-1}$ and approximately 1452 $cm^{-1}$.

An object of the invention is to provide a real-time nitrate sensor for detecting nitrate concentrations in-situ.

Another object of the invention is to apply wavelet analysis to FTIR/ATR spectra of eight different soils spiked with nitrate.

A further object of the invention is to apply wavelet analysis to deconvolute FTIR/ATR spectra of several soil types treated with nitrate fertilizers in-situ. The main features that distinguish objective 2 from 1 are—(a) working directly with field soils containing nitrate and (b) working only with soil pastes on a 1:1 soil to water weight basis.

Another object is to use a small number of selected wavenumbers rather than a continuum of wavelengths to predict nitrate contents so that a reasonably-priced mid-infrared spectrometer may be used for detecting low levels of nitrate typically found in agricultural soils.

Further aspects of the invention will be brought out in the following portions of the specification, wherein the detailed description is for the purpose of fully disclosing preferred embodiments of the invention without placing limitations thereon.

BRIEF DESCRIPTION OF THE SEVERAL VIEWS OF THE DRAWING(S)

The invention will be more fully understood by reference to the following drawings which are for illustrative purposes only:

Figure 5:
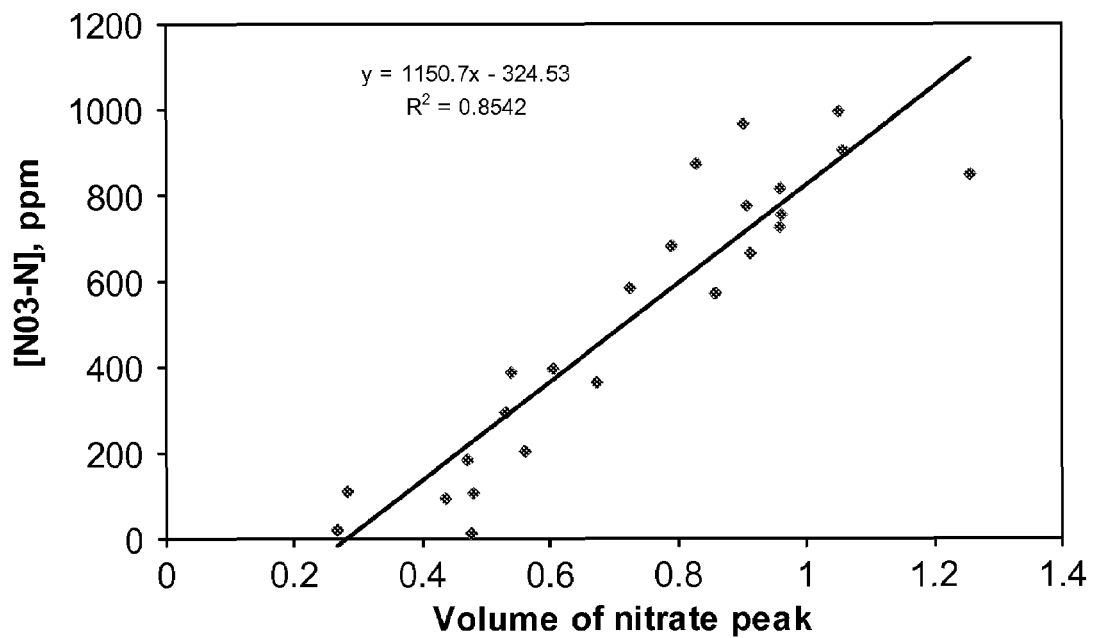

FIG. 5. shows a plot of nitrate concentration versus volume of nitrate peak for the three calcareous soils from Linker et al. (2004); the standard error was 112.0 ppm $NO_3^-N$; the coefficient of determination, $R^2$, was 0.85

Figure 6:
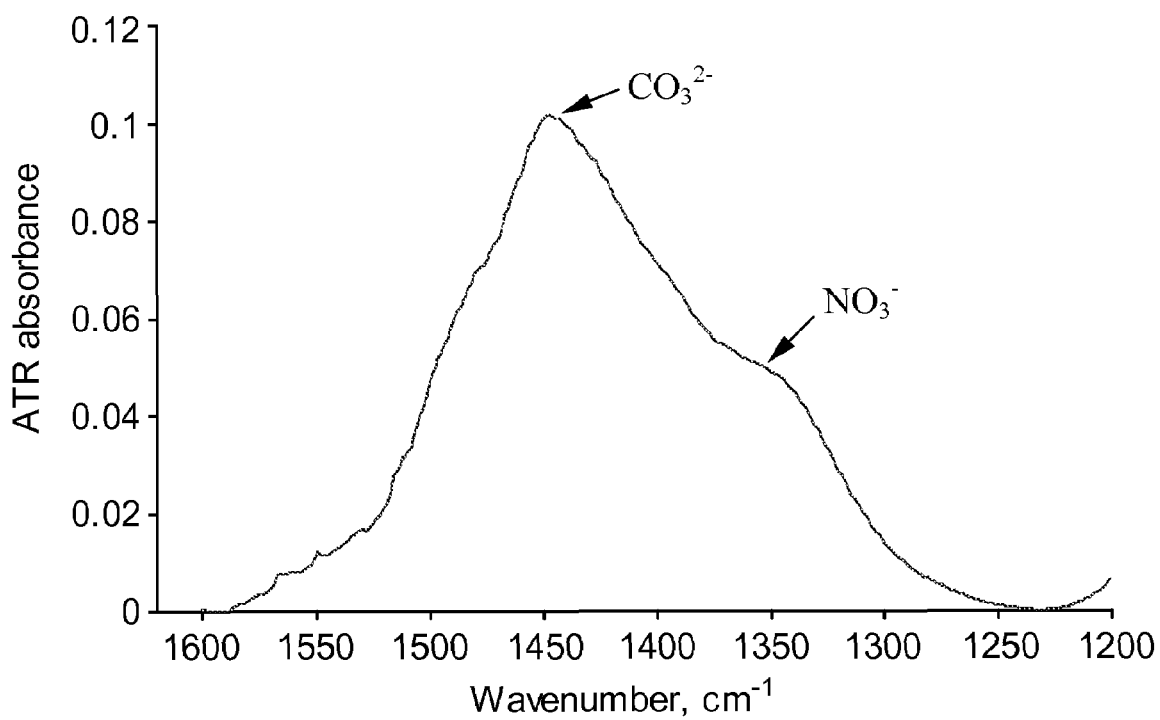
Figure 7:
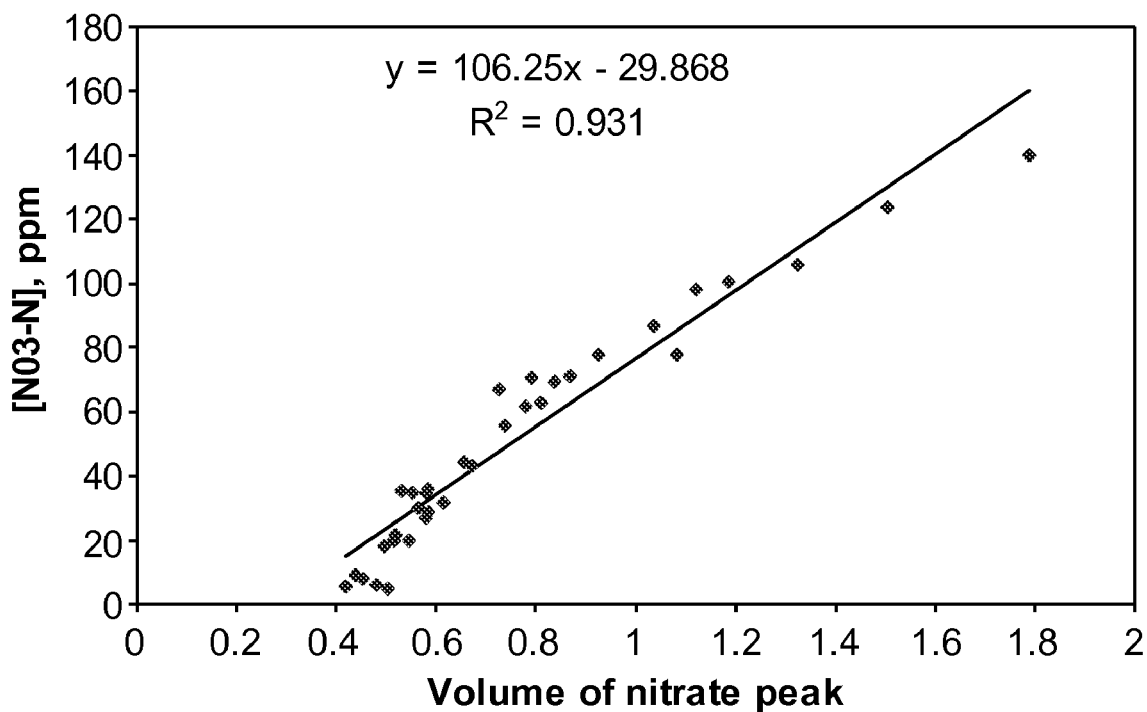

FIG. 6 is a plot of the baseline and water-corrected attenuated total reflection (ATR) absorbance spectra of calcareous soil with 872 ppm $NO_3^-N$ showing large $CO_3^{-N\,peak\,at}$ 1450 $cm^{-1}$ and shoulder due to $NO_3^-$ at approximately 1350 $cm^{-1}$ FIG. 7 is a plot of nitrate concentration versus volume of nitrate peak for Capay clay soil for two fertilizers pooled together; each point on the graph is an average of 10 subsamples; the standard error was 9.5 ppm $NO_3^-N$; the coefficient of determination, $R^2$, was 0.93.

Figure 8:
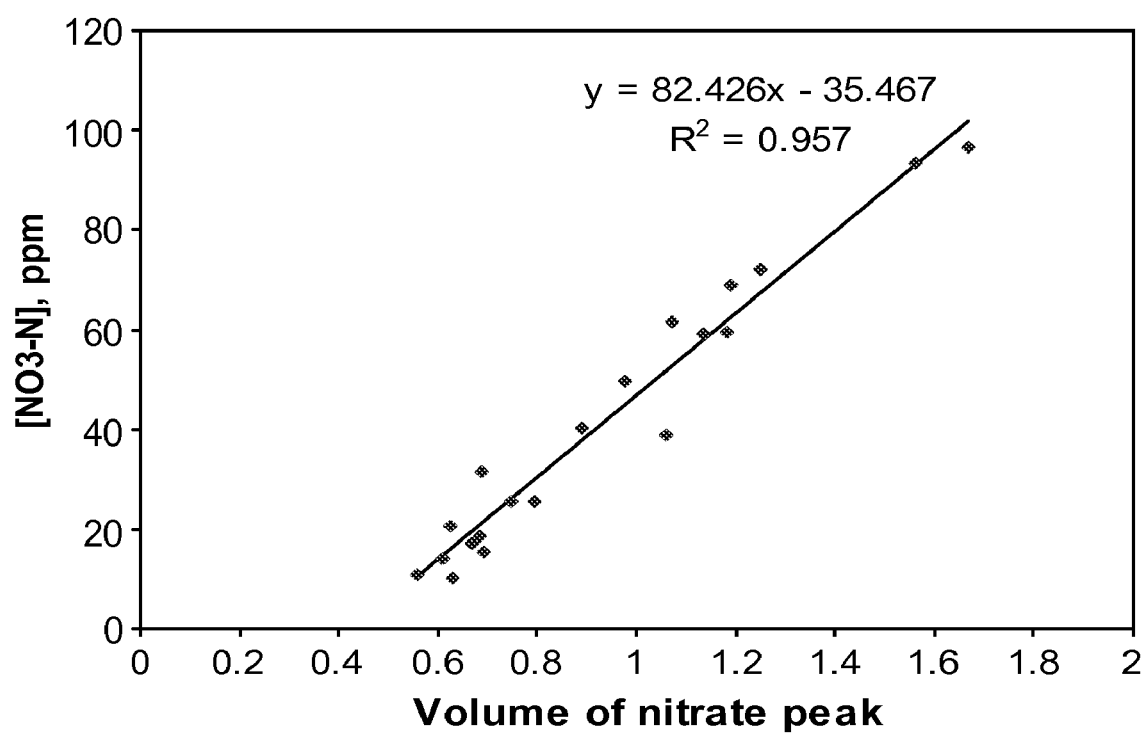

FIG. 8 is a plot of nitrate concentration versus volume of nitrate peak for Yolo loam soil for two fertilizers pooled together; each point on the graph is an average of 10 subsamples. The standard error was 5.8 ppm $NO_3^-N$; the coefficient of determination, $R^2$, was 0.96.

Figure 9:
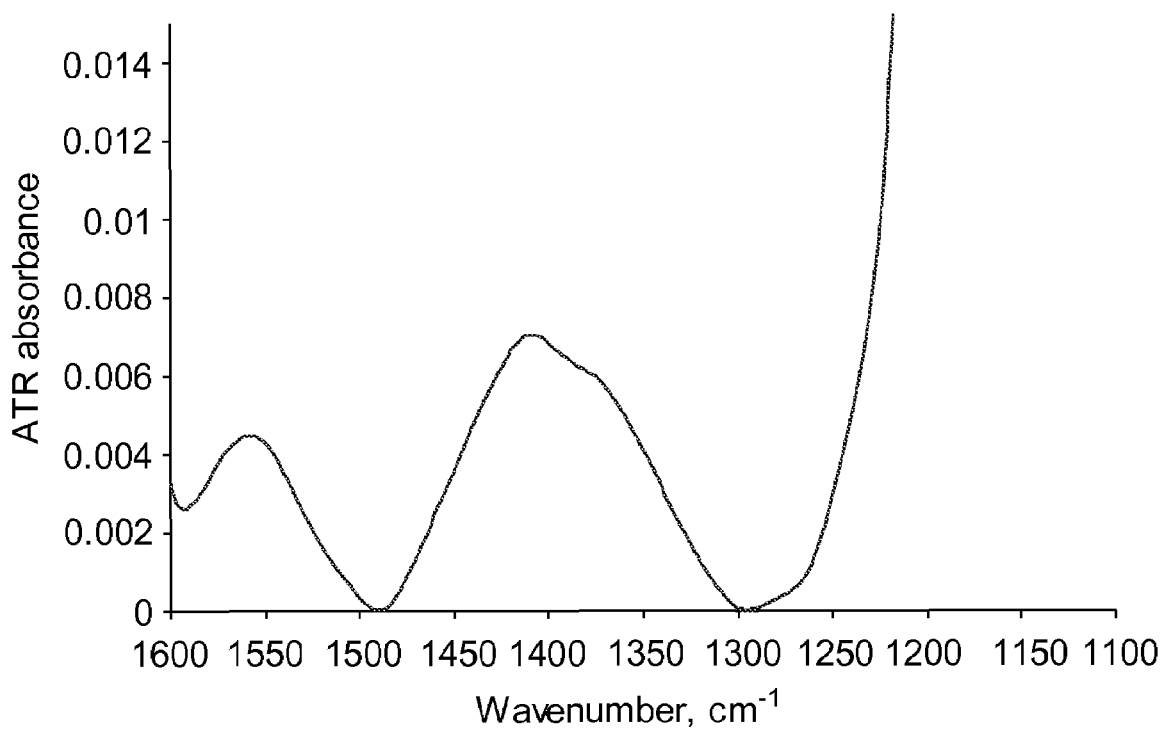

FIG. 9 is a plot of baseline and water-corrected two-dimensional ATR absorbance spectra for soil paste showing nitrate and carbonate peaks merged together.

Figure 10:
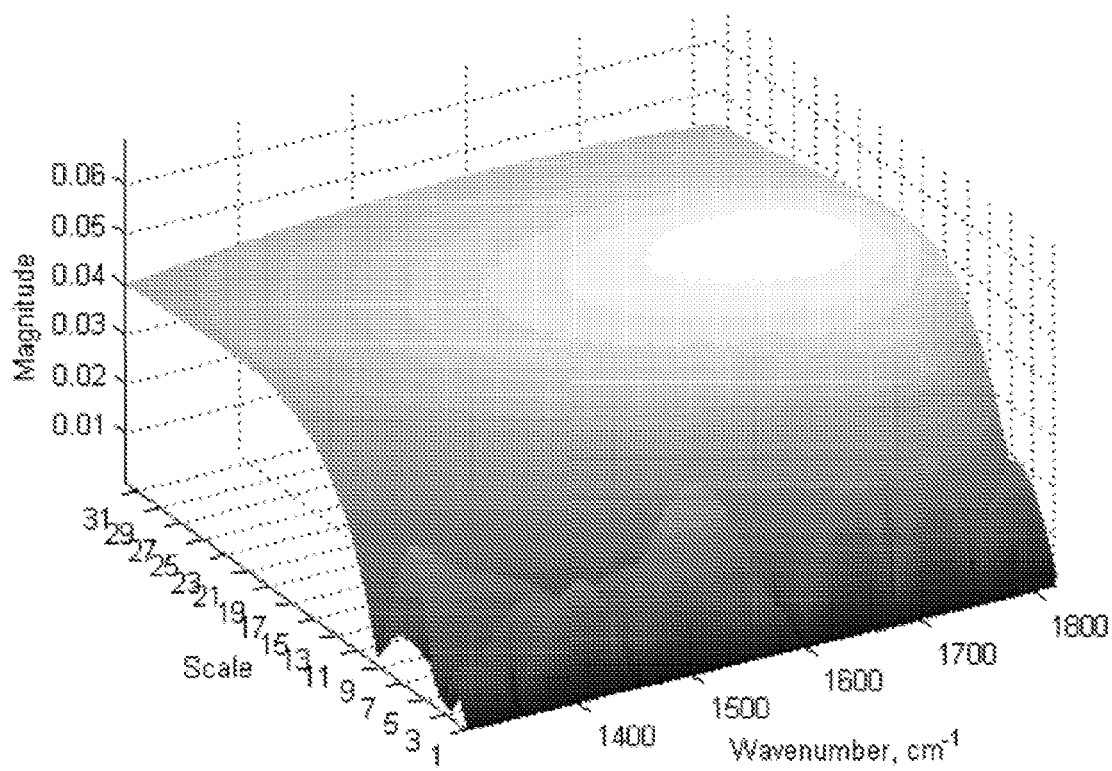

FIG. 10 is a 3-D wavelet decomposed plot showing nitrate peak around 1370 $cm^{-1}$ at scale 3 and carbonate peak near 1400 $cm^{-1}$ at scale 2.

Figure 11:
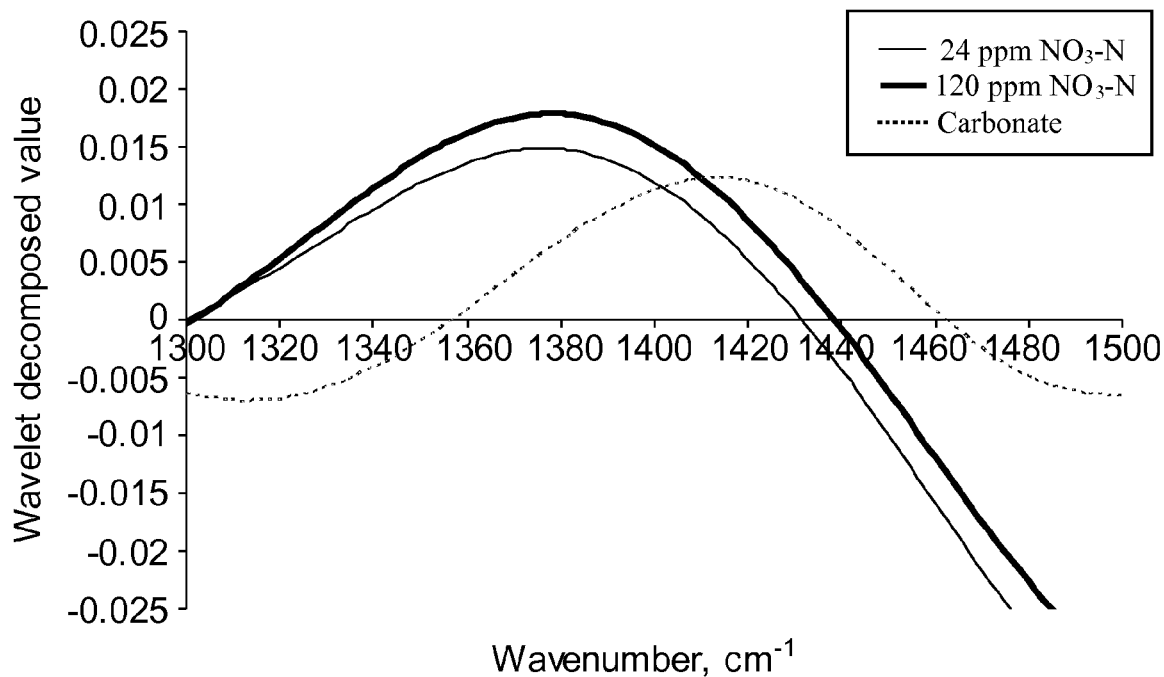

FIG. 11 shows a 2-D representation of the plot of FIG. 10, with wavelet decomposed values at scale 2 possibly due to carbonate and at scale 3 due to nitrate.

Figure 12:
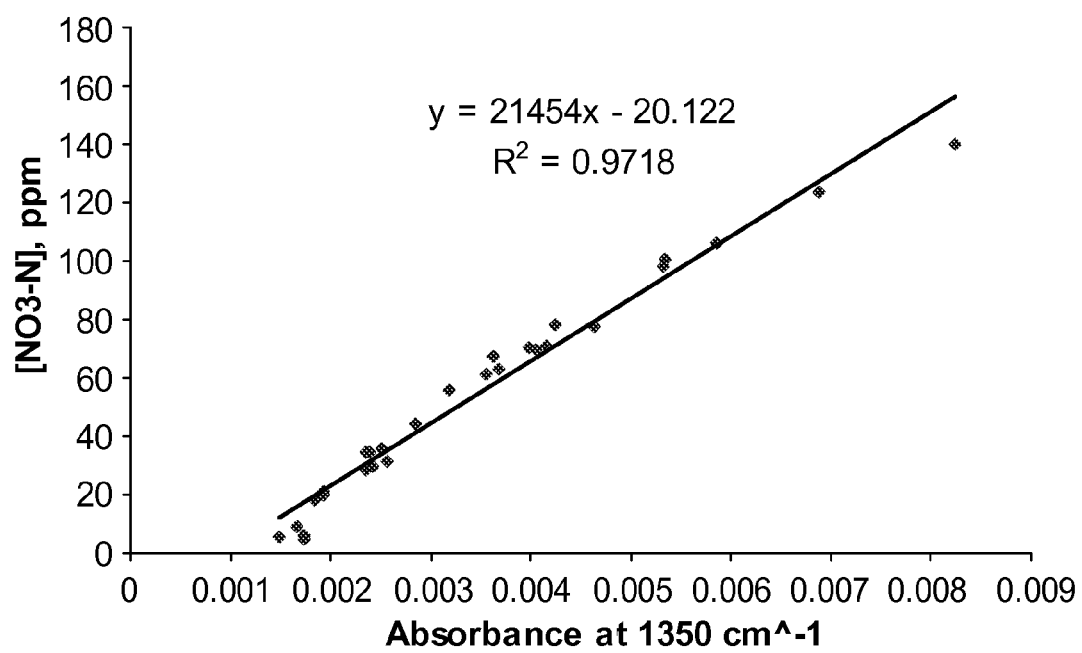

FIG. 12 is a plot of nitrate concentration versus absorbance at 1350 $cm^{-1}$ for Capay clay field experiments; the standard error was 6.3 ppm $NO_3^-N$; each point on the graph is an average of 10 subsamples; the coefficient of determination, $R^2$, was 0.97.

Figure 13:
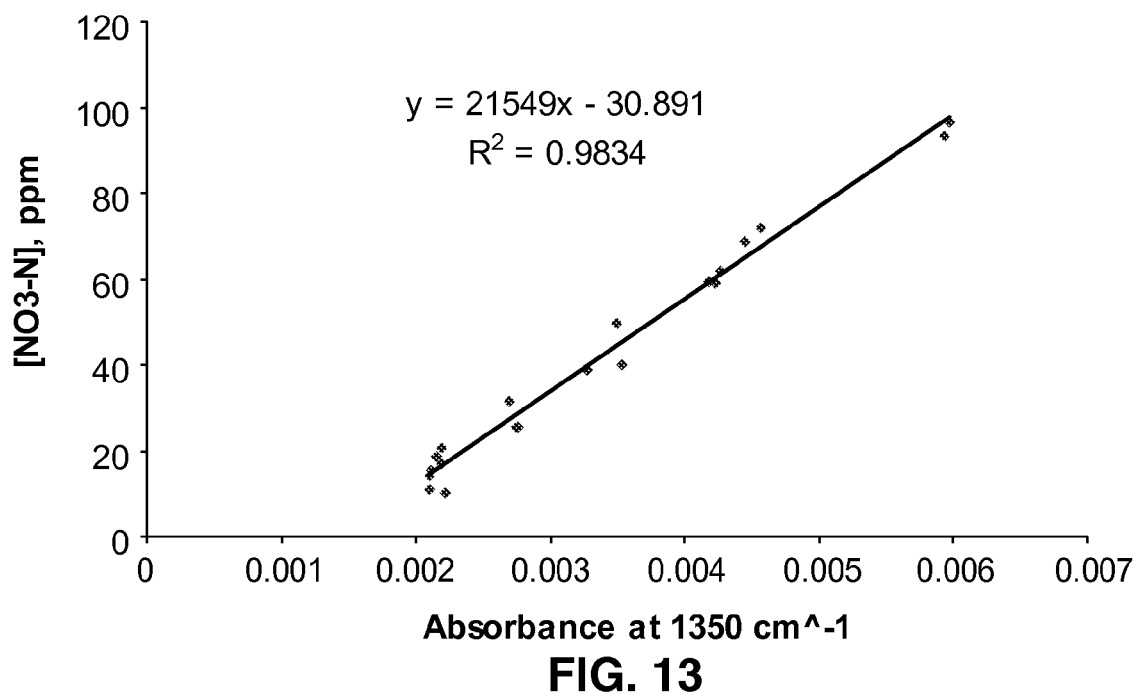

FIG. 13 is a plot nitrate concentration versus absorbance at 1350 $cm^{-1}$ for Yolo loam field experiments; the standard error was 3.6 ppm $NO_3^-N$; each point on the graph is an average of 10 subsamples; the coefficient of determination, $R^2$, was 0.98.

Figure 14:
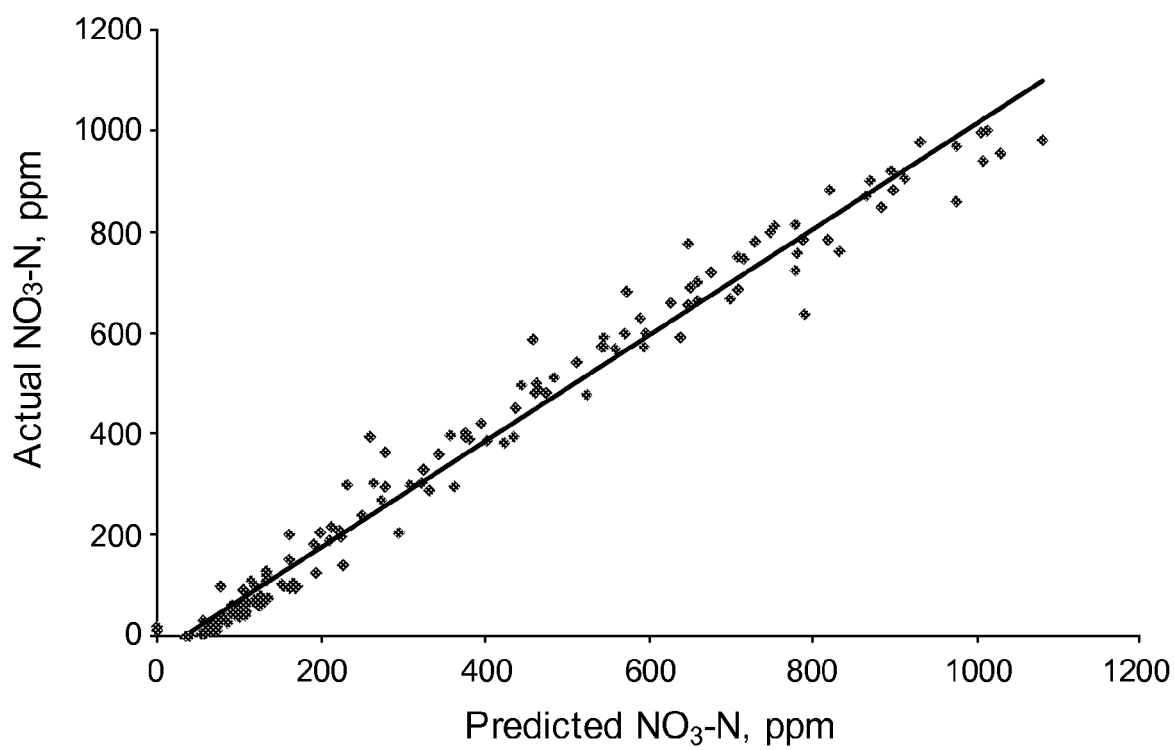

FIG. 14 shows a calibration plot for 10 soils pooled together using indicator variables method; the standard error was 45 ppm $NO_3^-N$; the coefficient of determination, $R^2$, was 0.98.

Figure 15:
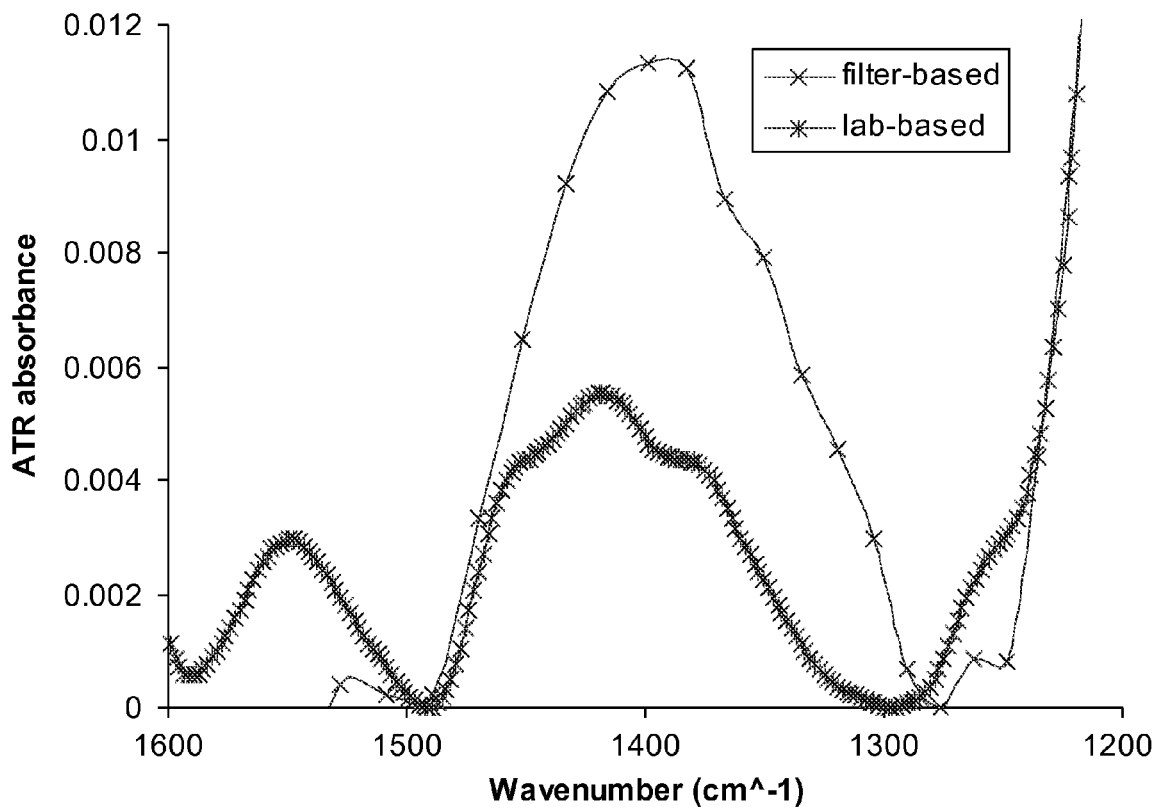

FIG. 15 is a plot showing comparison of spectra of field soil paste containing 25 ppm $NO_3$—N obtained from both the laboratory-based and filter-based spectrometers.

Figure 16:
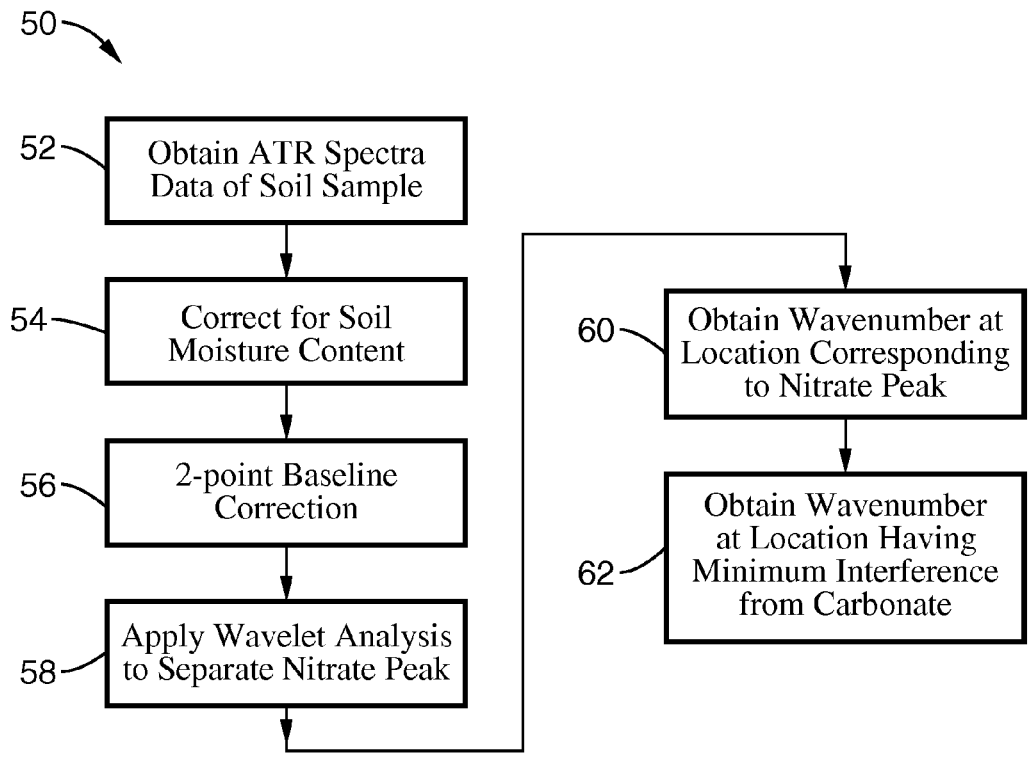

FIG. 16 is a method for generating a calibration equation for nitrate detection of a soil sample in accordance with the present invention.

Figure 17:
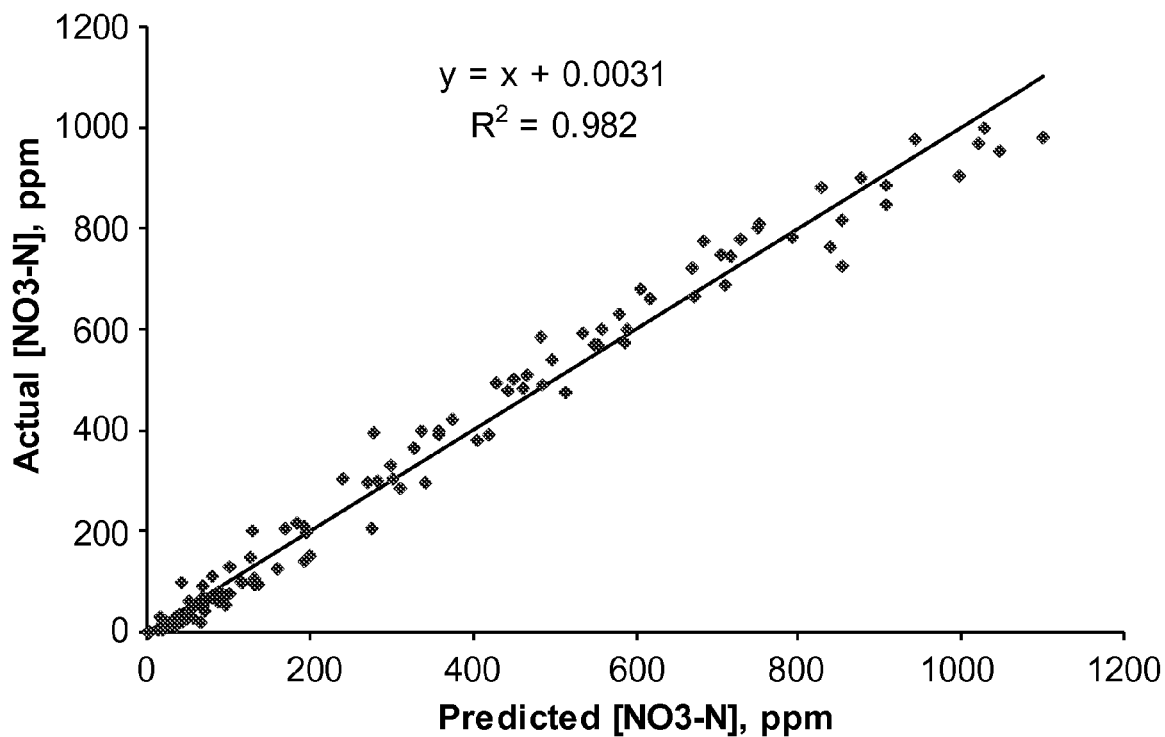

FIG. 17 is a calibration plot based on 124 soil samples for all soil sets pooled together. The standard error[1] of calibration was 41.8 ppm $NO_3$—N. Each point on the graph is an average of 10 subsamples.

Figure 18:
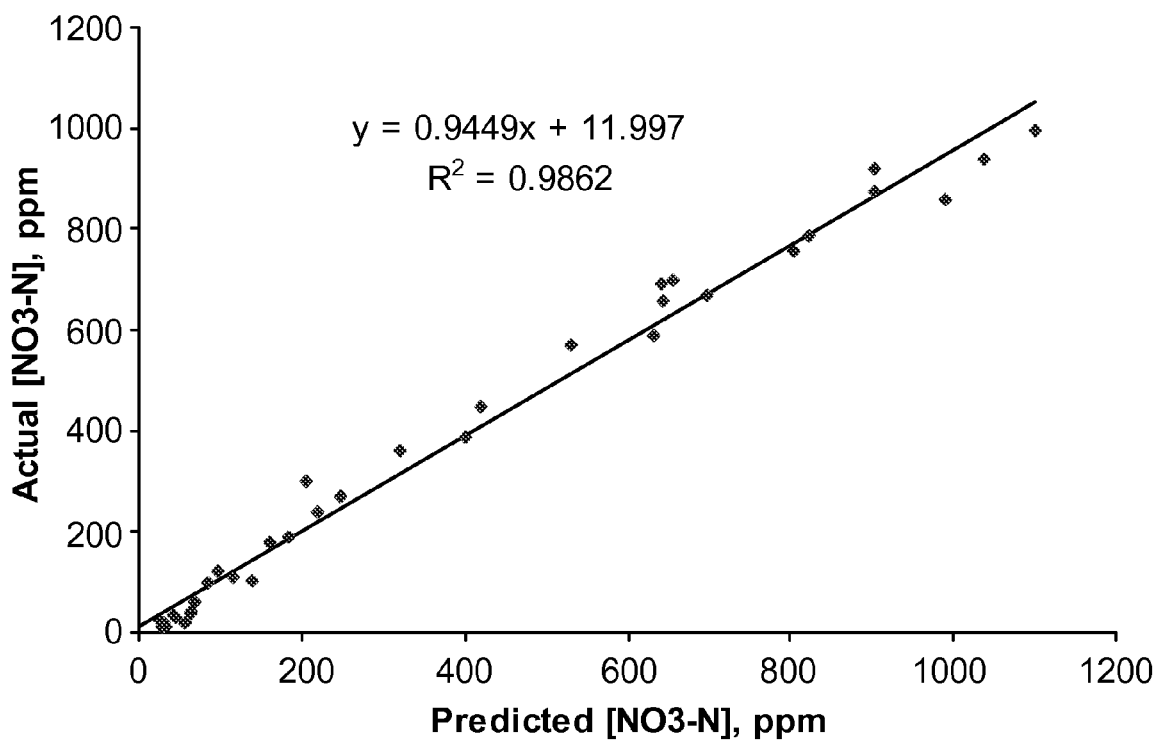

FIG. 18 is a validation plot based on 40 soil samples for all soil sets pooled together. The standard error[1] of validation was 40.1 ppm $NO_3$—N. Each point on the graph is an average of 10 subsamples.

Figure 19:
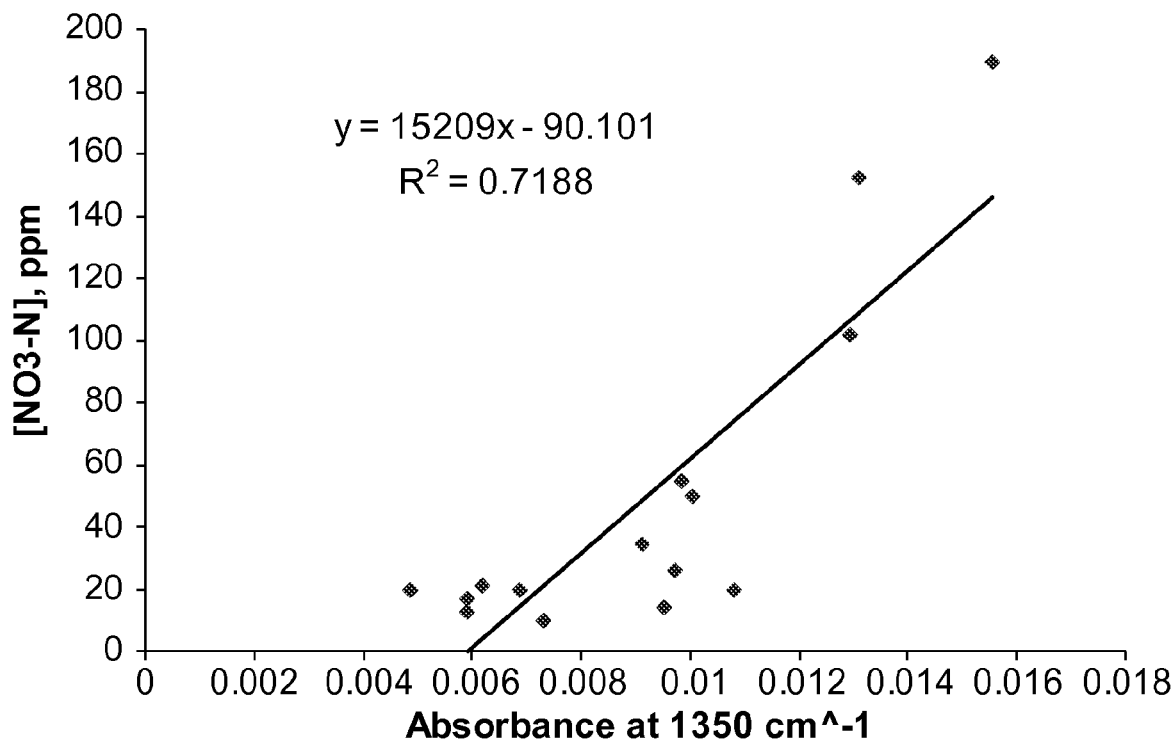

FIG. 19 is a calibration plot based on four soils obtained from a grower's fields. The standard error of calibration was 30.3 ppm $NO_3$—N. Each point on the graph is an average of 10 subsamples.

Figure 20:
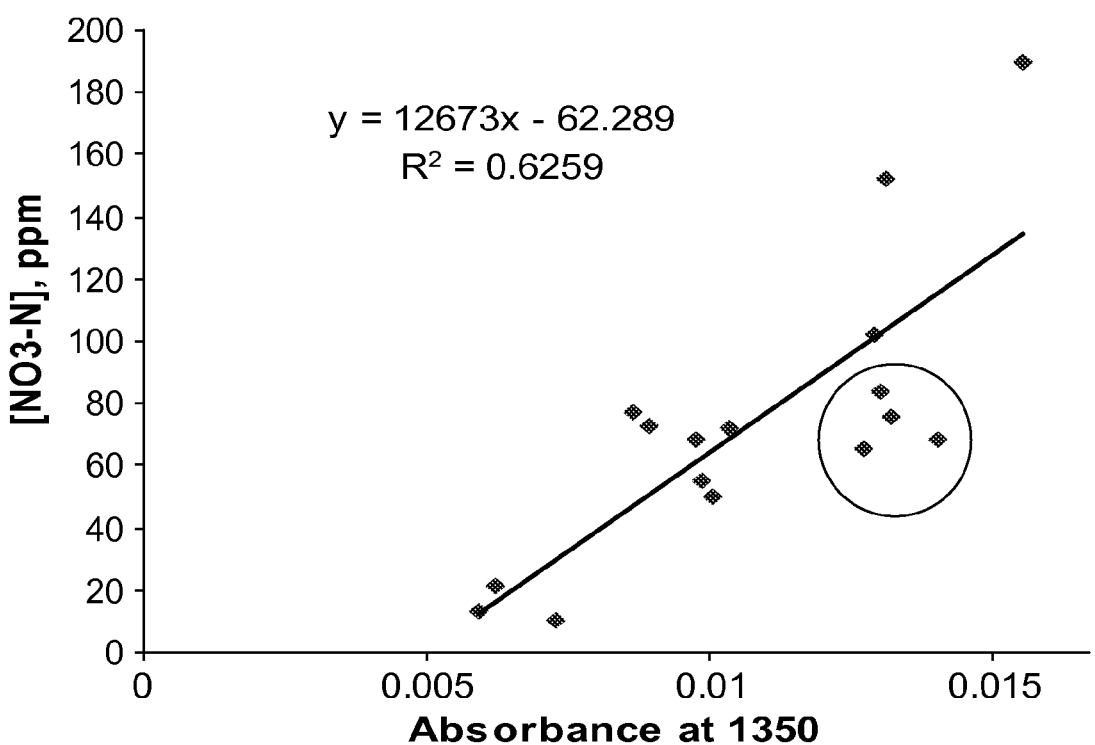

FIG. 20 is a calibration plot based on four soils obtained from a grower's fields, where two of the soils were artificially spiked with 50 ppm $NO_3$—N in addition to the nitrate added by the grower. The standard error of calibration was 29.3 ppm $NO_3$—N.

Figure 21:
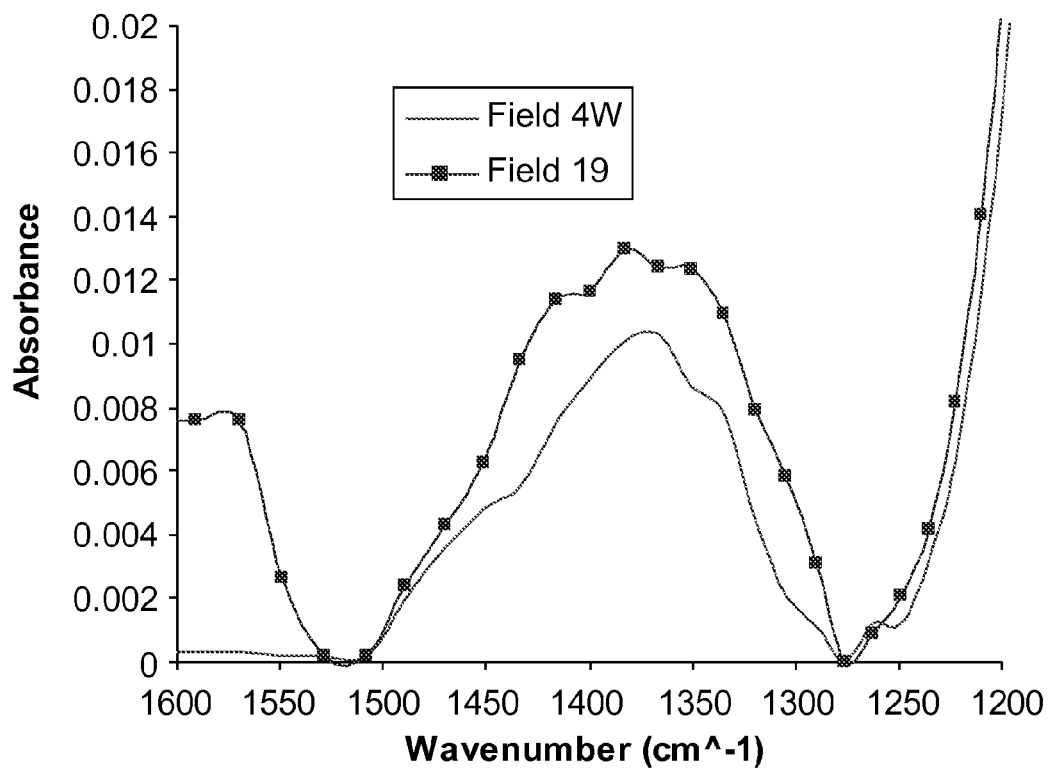

FIG. 21 shows absorbance spectra of two soils containing approximately 75 ppm $NO_3$—N. These soils were obtained from a grower's fields and were artificially spiked with 50 ppm $NO_3$—N in addition to the nitrate added by the grower.

Figure 22:
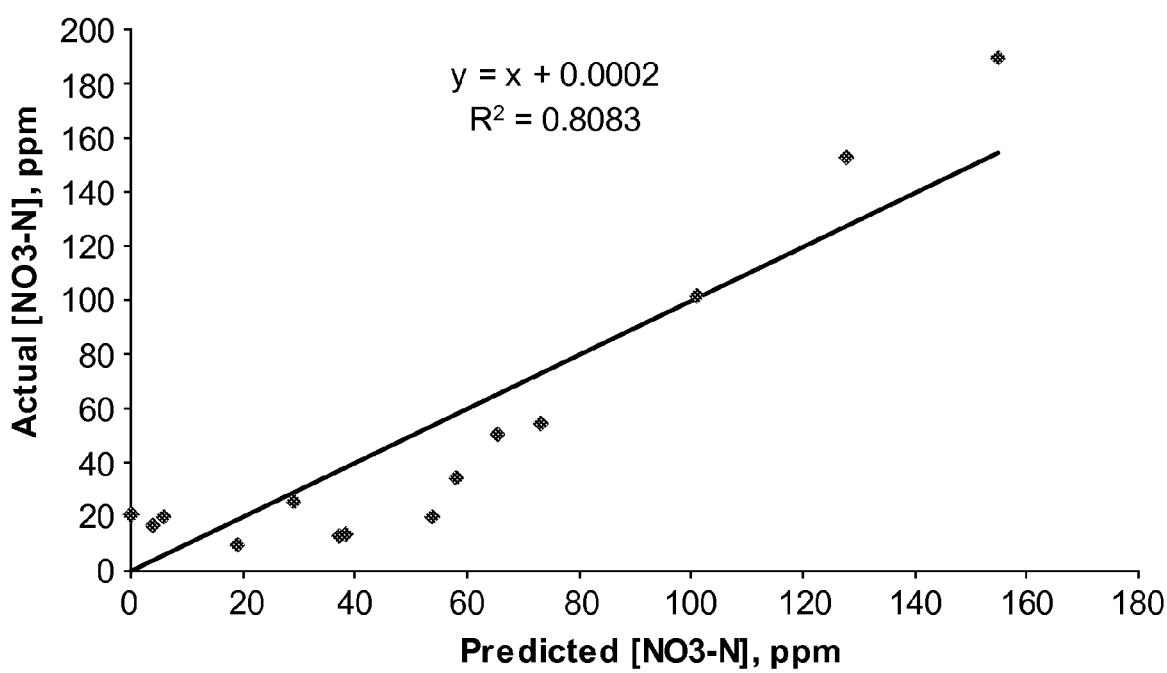

FIG. 22 is a calibration plot of a one-term model based on the absorbance at 1399 $cm^{-1}$ for 16 soil samples from four growers' fields, obtained from a filter-based spectrometer. The standard error of calibration was 25.0 ppm $NO_3$—N.

Figure 23:
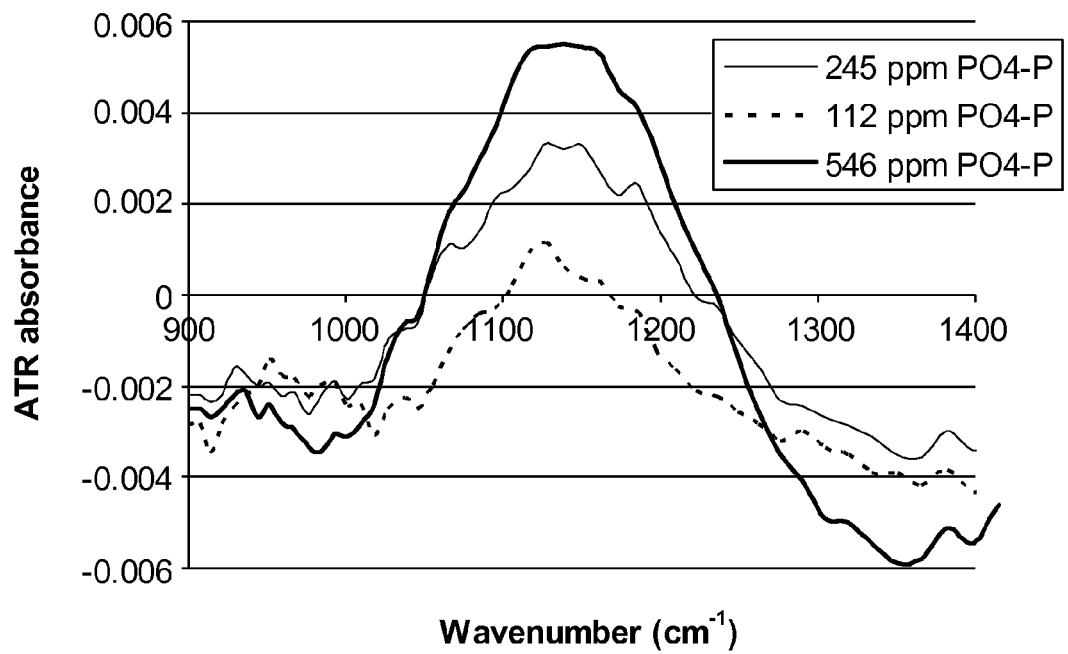

FIG. 23 is a plot of raw ATR spectra of $NaH_2PO_4$ in water collected from a filter-based spectrometer.

Figure 24:
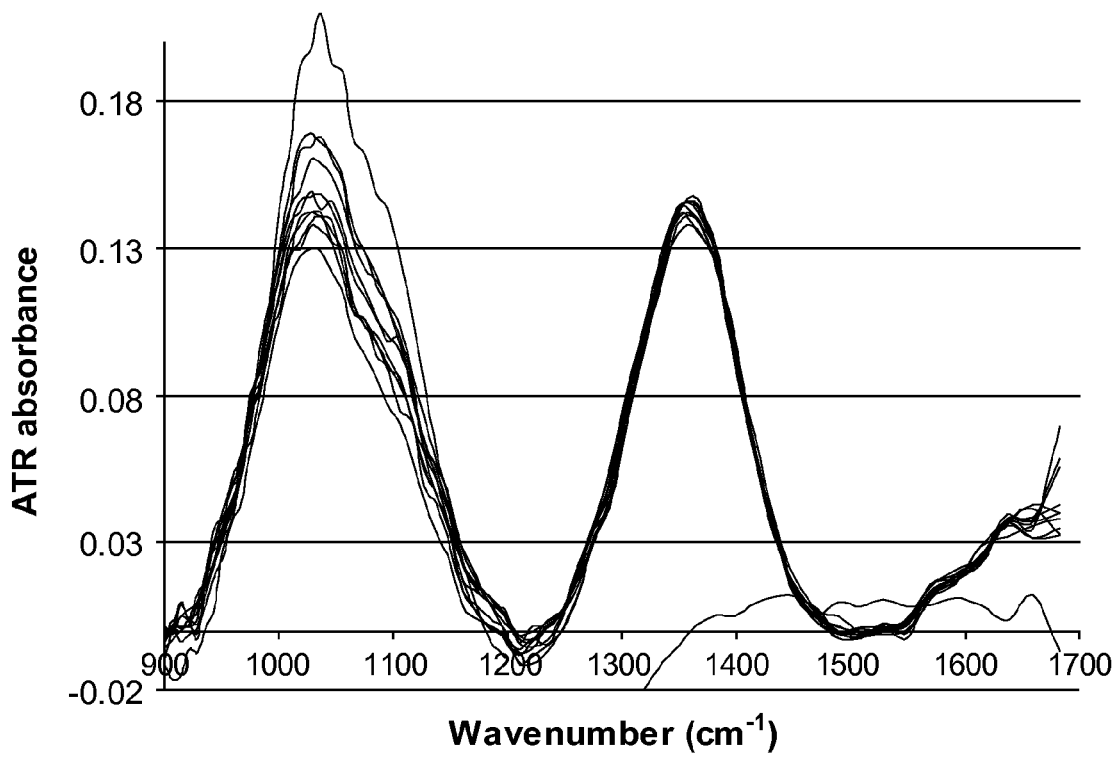

FIG. 24 illustrates ATR spectra of phosphate varying in concentration from 0 to 230 ppm $PO_4$—P in Yolo loam soil.

Figure 25:
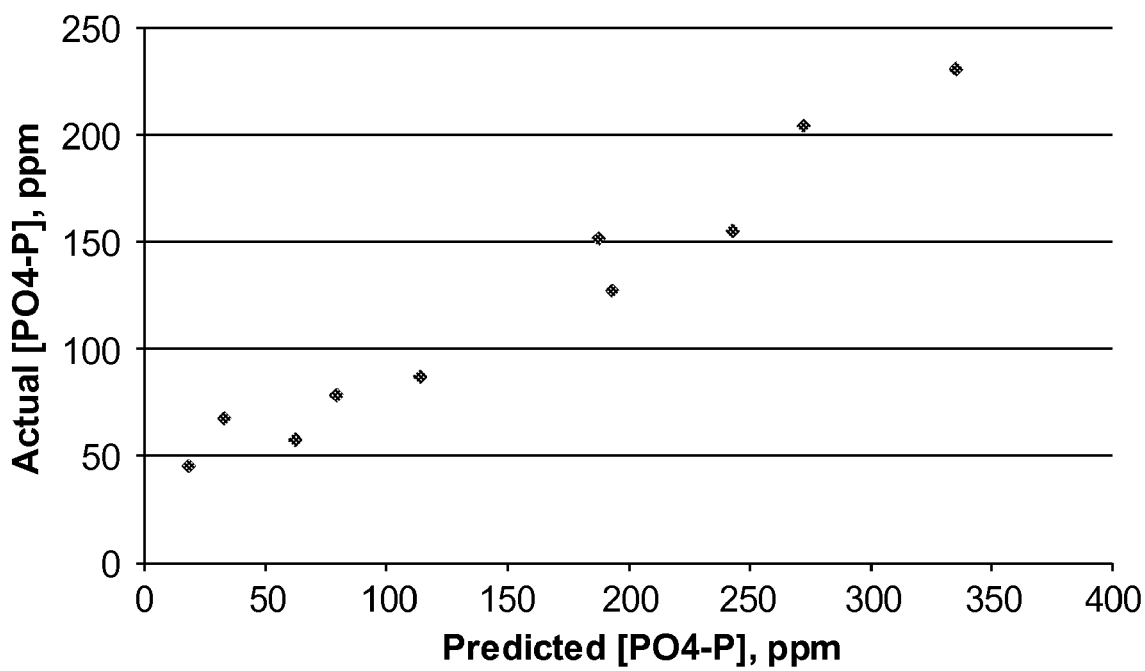

FIG. 25 shows a calibration plot for phosphate based on 10 Yolo loam soil samples. The standard error of calibration was 23.7 ppm $PO_4$—P.

Figure 26:
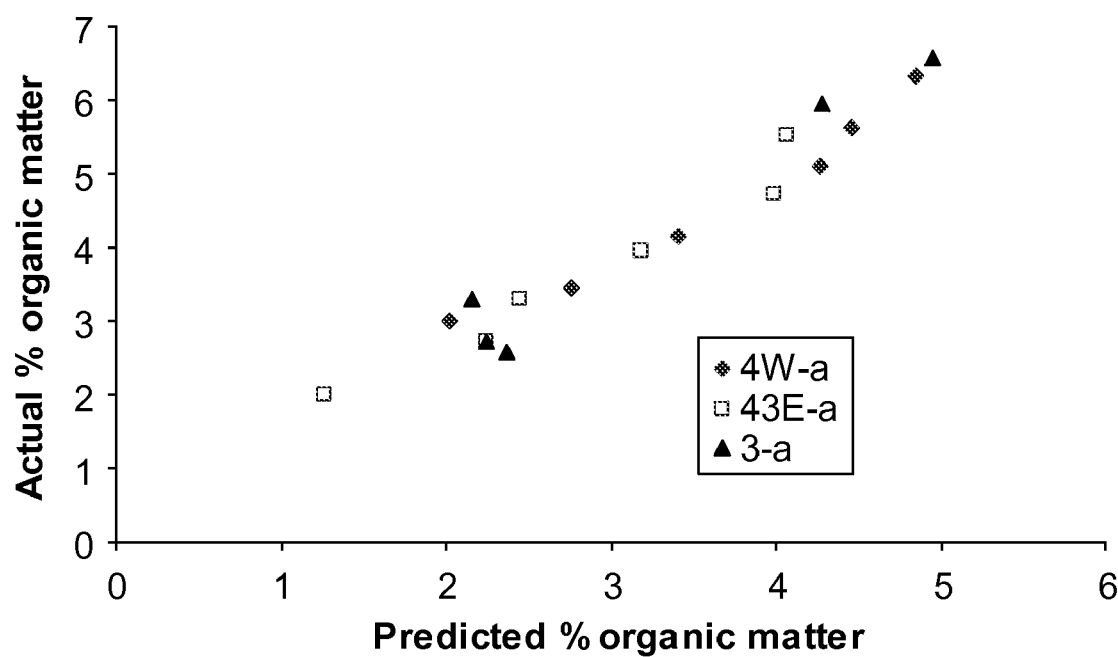

FIG. 26 is a calibration plot for organic matter based on three fields. The standard error of calibration was 0.25% organic matter.

DETAILED DESCRIPTION OF THE INVENTION

Referring more specifically to the drawings, for illustrative purposes the present invention is embodied in the methods generally shown in FIG. 2 through FIG. 26. It will be appreciated that the apparatus may vary as to configuration and as to details of the parts, and that the method may vary as to the specific steps and sequence, without departing from the basic concepts as disclosed herein.

1. Overview of Analytical Techniques (a). Fundamental Nitrate Peaks

Figure 1:
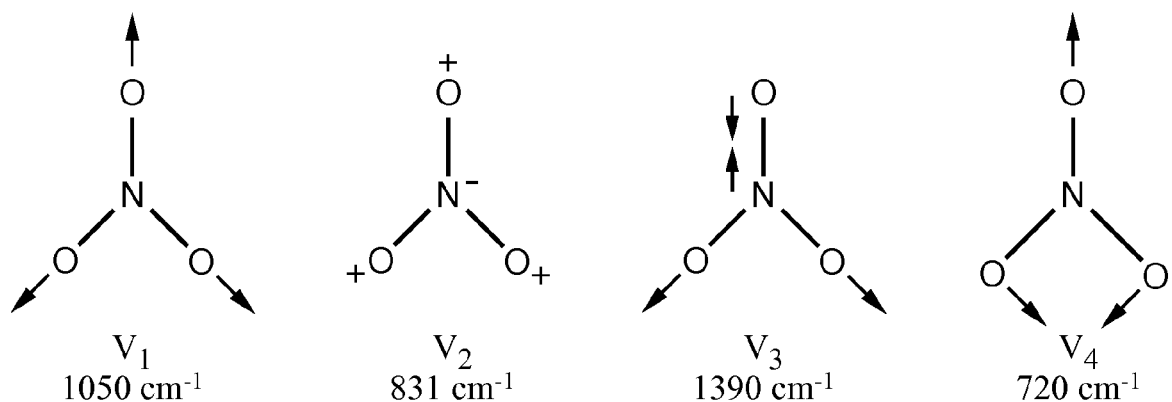
FIG. 1 is a diagram of the fundamental modes of vibration of a $NO_3^-N$ molecule.

Nitrate is a polar molecule and has 4 fundamental modes of vibration as shown in FIG. 1. The location of the vibrational modes is given in terms of wavenumber. When dealing with mid-IR spectra, the wavenumber ($cm^{-1}$) is commonly used rather than wavelength, because the wavenumber is proportional to the energy and frequency of the radiation. The relationship between wavenumber ($v$, $cm^{-1}$) and wavelength ($\lambda$, m) is given as:

$$v = \frac{10^7}{\lambda} \quad (1)$$

Referring to FIG. 1, the $v_1$ band is due to symmetric stretch, $v_2$ is from out-plane-bending, $v_3$ is from asymmetric stretch, and $v_4$ is due to in-plane bending. The peak due to $v_1$ is IR inactive and observable only in metal nitrates. Peaks due to $v_2$ and $v_4$ are also not observable in the low nitrate concentrations of interest typically found in agricultural fields (<150 ppm $NO_3$—N). The fundamental peak known as $v_3$ offers the most potential for determining nitrate concentrations of interest to precision farming, and all the results presented in this paper are based on this peak. Other peaks due to overtones and combinations found in the NIR region tend to be much weaker than the fundamental peaks in the mid-IR region and are overshadowed by absorbances due to carbonate and water.

(b) Fourier Analysis

Most measured signals are usually of a two-dimensional form containing time- and amplitude-related information. The time domain representation of a signal doesn't always present all the information so some sort of a mathematical transform is often applied to obtain a more useful representation. In many cases, the frequency domain contains much more useful information than does the time domain. There are many different transforms that can be applied, including the Fourier transform, the Radon transform, and the wavelet transform.

Almost all measured signals consist of multiple frequencies occurring over a given timeframe. In order to extract the individual frequencies corresponding to the components that make up the signal, a harmonic analysis can be done. The most common method of harmonic analysis is the Fourier transform (FT), defined as:

$$X(\omega) = \int_{-\infty}^{\infty} x(t)e^{-j\omega t}dt \quad (2)$$

where $X(\omega)$ represents the signal as a function of frequency, $x(t)$ is the time-domain representation of the signal, and $\omega$ is the angular frequency equal to $2\pi f$, where f is the frequency in Hertz. In reality, the signal is obtained at discrete times rather than continuously. Therefore, the integral in Equation 2 should be replaced by a summation. From Euler's formula, the exponential term can be written as:

$$\cos(\omega t) - j\sin(\omega t) \quad (3)$$

Therefore, the result of applying the Fourier transform to a time domain signal is to represent it as a sum of sines and cosines.

After applying the Fourier transform, the original time-domain signal is transformed into the frequency domain. A limitation of this technique is that the time information is lost in the transformed domain, i.e., a plot of amplitude vs. frequency is possible but information about where these frequency components exist in time domain is not available. In dealing with stationary signals where all frequency components exist at all times, this limitation presents no problem. However, most measured signals are nonstationary, where different frequencies are present at different times. With Fourier analysis, one cannot know both the time and frequency information of the signal.

(c) Short-Time Fourier Analysis

A technique developed to deal with this limitation is called the Short-Time Fourier Transform (STFT). Basically what this technique does is to assume a small portion or window of the signal is stationary. Next a window function of finite length is used to multiply the signal and the FT of this product is obtained. Then the window is translated to a new location, multiplied by the signal, and the FT is obtained again. This procedure is repeated for the entire length of the signal. The STFT is defined by Equation 4 as follows:

$$STFT(\tau, \omega) = \int x(t)w^*(t-\tau)e^{-j\omega t}dt \quad (4)$$

where $\tau$ is the time the windowing function is translated, $\omega$ is the angular frequency, w is the windowing function, and * denotes complex conjugate. As Equation 3 shows, for every translation ($\tau$) and frequency ($\omega$) a new STFT coefficient is computed. Therefore since the FT is determined at known time locations, a three-dimensional plot can be constructed based on frequency, time, and amplitude. Note that the STFT is nothing more than the FT shown in Equation 1 multiplied by a translating windowing function, w, of finite width.

Because the windowing function used is of finite width, time information may be obtained, but the frequency resolution degrades. With the FT, the frequencies present in the signal are known, thus giving no frequency resolution problems. But the FT basically uses a window of infinite length, thus giving no time information. With the STFT using a window of finite length, time information is now known but the frequency resolution is poorer compared to the FT. Rather than knowing the exact frequencies present in the signal, only a band of frequencies is known. Using a wide window with the STFT provides good frequency resolution but poor time resolution. On the contrary, a narrow window provides good time resolution but poor frequency resolution. A solution to the problems associated with STFT and FT would be to use a window of varying width, depending on the magnitude of the frequency components and where in time these components are located relative to the signal. This is essentially what wavelet analysis does and will be discussed in the following section.

(d) Wavelet Analysis

Multiresolution analysis (MRA) allows for signal analysis at different frequencies with different resolutions. The high frequency components of signals typically require good time resolution but do not need very high frequency resolution. In contrast, the low frequency components require good frequency resolution but do not need very high time resolution. Most signals consist of high frequency components for short periods of time and low frequency components for longer periods of time.

Wavelet analysis was developed to overcome the limitations of the Fourier Transform with nonstationary signals and the resolution problems of the Short Time Fourier Transform. The procedure is similar to Fourier analysis where the signal is multiplied and integrated by a function. However, rather than using sine and cosine functions, wavelet analysis uses scaled and shifted versions of a base function called a mother wavelet. Unlike sine and cosine functions these mother wavelets are local and finite, making them ideal for approximating signals with sharp peaks and discontinuities. Selecting a mother wavelet that represents the general shape of the signal is important.

The continuous wavelet transform (CWT) is defined as:

$$CWT(\tau, s) = \frac{1}{\sqrt{|s|}} \int x(t)\psi *\left(\frac{t-\tau}{s}\right) dt \quad (5)$$

where $x(t)$ is the time-representation of the signal, t is time, and * stands for the complex conjugate (See Haykin, S., and B. Van Veen. 2003. *Signals and Systems*. $2^{nd}$ ed. New York: John Wiley & Sons, Inc., herein incorporated by reference in its entirety). The continuous wavelet transform of the signal is a function of two factors: s and $\tau$. The factor s is the scale factor and causes the mother wavelet to either stretch (s>1) or dilate (s<1). The translation factor, $\tau$, is related to the location of the window as it is shifted along the signal. The term, $\psi$, represents the mother wavelet.

The wavelet procedure used for the soil spectral analyses involved deconvoluting with a Coiflet three mother wavelet as the basis function. Additional information concerning Coiflet wavelets can be found in Daubechies, I, 1992, Ten Lectures on Wavelets, *Society for Industrial and Applied Mathematics*. Philadelphia, Pa.: 258-259, herein incorporated by reference in it entirety. In addition, those skilled in the art will appreciate that Coiflet wavelets have the highest number of vanishing moments for a given support width. The number of vanishing moments determines the order of the polynomial used to approximate the signal. Therefore, a Coiflet wavelet approximates a signal more precisely than many other wavelets. A Coiflet wavelet is also compactly supported which allows for distinguishing discontinuities or singularities in a signal. It is commonly used for spectral signals of soils and other biological materials.

An algorithm (e.g., using Matlab) was written that utilizes the wavelet toolbox to perform a continuous wavelet decomposition analysis of the spectral signals.

(e) Application of Techniques to Analyze Soil Samples

Figure 2:
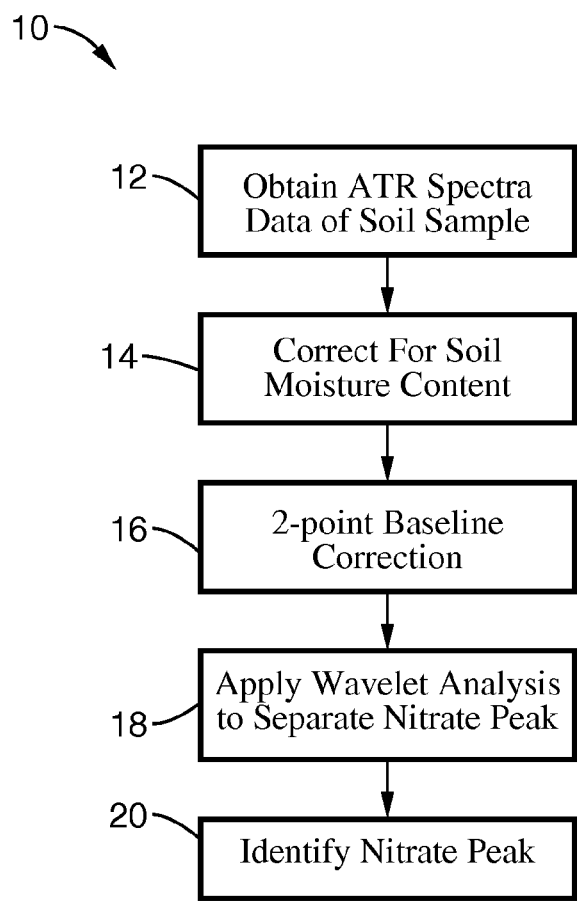
FIG. 2 shows a calibration method for determining soil content in accordance with the present invention.

Referring to FIG. 2, a calibration procedure 10 in accordance with the present invention is illustrated. Using an IR instrument such as a spectroscope, ATR spectra data of a soil sample are obtained at step 12. In each of the experiments, equal weights of dry soil and distilled water were used to create a paste (as will be described in further detail below). Hence, the soil spectra are corrected for this added moisture by taking the negative logarithm of the ratio of soil sample and background (water) single beam spectra at step 14.

Since spectra collected in similar conditions are slightly scaled, biased, or tilted relative to each other, baseline correction procedures are applied at step 16 in order to compare different spectra. A two-point baseline correction was applied to each spectrum. This procedure involved fitting a line between minimums located at approximately 1300 $cm^{-1}$ and 1500 $cm^{-1}$ and adjusting the slope of this line to be zero. The spectra were then offset so these minimums occurred at an absorbance value of zero. This interval included the nitrate peak of interest, which is located in the 1370-1380 $cm^{-1}$ range.

A wavelet analysis is then performed at step 18 to deconvolute the complex two-dimensional soil spectra into three-dimensional plots showing peaks corresponding to carbonate, nitrate, organic materials, and water.

Figure 3:
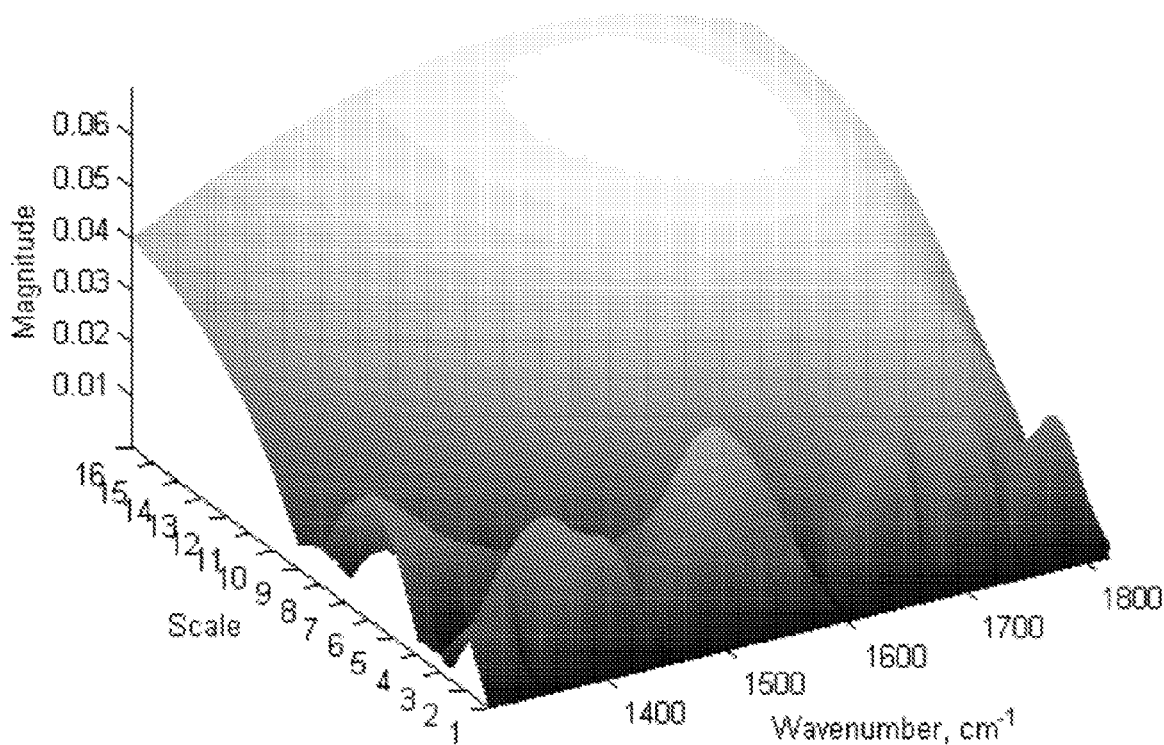
FIG. 3 is a three-dimensional wavelet deconvoluted graph of a soil paste contained 59 ppm $NO_3^-$ showing peak due to nitrate (circled), organic matter, water, and other components.

FIG. 3, illustrates a three-dimensional plot created to display the peaks in each of the signals. From this plot, the nitrate peak may be identified at step 20 in FIG. 2 (in the 1370 to 1390 $cm^{-1}$ range) and the volume of the peak calculated. The interaction of the nitrate ion with other metals can cause the nitrate peak to shift from 1390 $cm^{-1}$ to as far as 1360 $cm^{-1}$. Therefore, a second algorithm was written to detect the coordinates of the nitrate peak using a Savitsky and Golay routine (Savitsky, A. and J. E. Golay. 1964. Smoothing and Differentiation of Data by Simplified Least Square Procedure. *Analytical Chemistry* 36:1627-1639, herein incorporated by reference in its entirety), Once the peak coordinates are identified, the volume of the peak may be estimated by integrating over a wavenumber range, e.g. 10 $cm^{-1}$ on both sides of the peak and scale range from 2 to 4 using MATLAB. The above range was experimentally determined to adequately represent the nitrate peak volume with minimal influence from adjacent peaks and this same range was used for all the samples.

2. Experiment #1

(a) Test Setup

Two separate tests were performed to obtain FTIR/ATR soil spectra: one laboratory procedure in Israel (soil types used in Linker et al.), and a field test in California.

The Israel included sandy loam, peat and clay soils, with varying levels of carbonate and organic matter. The texture and carbonate related information for these soils can be found in Table 1. The soils were pre-treated first by oven drying (120° C.) for 24 hours. Nitrate varying in concentration from 0 to 1000 ppm $NO_3$—N was added in the form of KNO3. Distilled water was then added to form a paste. The first three soils listed in table 1 were known to be calcareous, which meant that they contained large amounts of carbonate. Carbonate has a fundamental vibrational frequency close to that of the nitrate peak at 1390 $cm^{-1}$, which presents some interference issues when trying to estimate nitrate concentration.

Wavelet analysis was also applied to field soils containing nitrate concentrations typical of agricultural applications (<150 ppm $NO_3$—N). Nitrate was added to Capay clay and Yolo loam soils in the field in the presence of interfering compounds such as bicarbonate and organic matter. Table 2 shows the pH values, $CO_3^{2-}$ contents, $HCO_3^-$ contents, and $NO_3^-$ contents for clay and loam soils. The experimental design was set up as a split plot treatment structure. The main factor was soil type (Capay clay and Yolo loam) and the subfactor was nitrate source [$Ca(NO_3)_2$ or $NH_4NO_3$]. Six plots were used for each soil type and five levels of nitrate concentration were used within each plot [15 m (50 ft) long].

On half of the plots, $NH_4NO_3$ was applied as the source of nitrate, and on the other half $Ca(NO_3)_2$ was applied as the nitrate source. This meant there were three replications of each treatment combination. Each plot was divided into five 1.8-m (6-ft) wide strips and each strip received a different amount of nitrate varying from approximately 0 to 140 ppm $NO_3$—N. This range of nitrate concentrations is typically found in agricultural fields during the growing seasons. The response variable was the slope of the calibration line of nitrate concentrations vs. wavelet decomposed nitrate peak volumes.

For each plot, soluble nitrate was sprayed on the soil and the soil was rotary tilled to allow the nitrate to mix with the soil. Five days later, soil samples were collected and stored in a freezer for further processing and analysis. The soil samples were then oven dried at 55° C. (131° F.) for 48 hours, ground, and passed through a sieve (75 µm). A number 200 (75 µm) sieve was used in order to prevent shattering or scratching the ATR crystal by larger sharp particles in the soil sample such as rocks. To allow for uniform distribution of nitrate, water was added to the samples to bring the moisture contents to approximately 20%. It was found that a soil paste or slurry provided the contact needed to produce spectra with identifiable nitrate peaks for the low nitrate concentrations under study.

The samples were left at room temperature for two days and then oven dried again at 55° C. Once again the samples were ground, sieved (75 µm), and finally mixed with distilled water on a 1:1 weight basis to form a solution. A randomly selected sample from each strip was sent to an analytical laboratory for nitrate content determinations, where a flow injection analysis was used.

A Mattson Galaxy 3000 RS-1 FTIR spectrometer with ATR crystal was used for all the field spectra measurements. The spectrometer was equipped with a Ge/KBr beam splitter, water-cooled Globar ceramic source, and a mercury cadmium telluride (MCT) detector. Each sample was divided into ten subsamples, and the spectra of each subsample was obtained individually. Soil solutions were spread over the crystal and argon was used to purge the cell of $CO_2$. The ATR spectra were measured with 64 scans per sample using 4 $cm^{-1}$ resolution and calculated by taking the negative logarithm of the ratio of sample and background single beam spectra.

The spectra from Israel were measured using a Bruker Vector 22 FTIR/ATR spectrometer equipped with a DTGS detector. All spectra were obtained using 2 $cm^{-1}$ resolution at a rate of 32 scans per sample. As with the spectra collected with the Mattson spectrometer, baseline-correction and water subtraction procedures were performed.

(b) Wavelet Analysis of the Soil Samples

In accordance with FIG. 2 detailed above, wavelet analysis was applied to the smoothed, baseline corrected soil spectra and the peak volumes due to nitrate were determined and correlated to nitrate contents. Information obtained by using wavelet analysis allowed for selecting a single wavenumber at which the absorbance value at this location depended only on nitrate concentration and was not influenced by an interfering ion such as carbonate.

Because of the interfering effect of carbonate found in Linker et al. (2004), the analysis was first performed separately on calcareous and non-calcareous soils.

Figure 4:
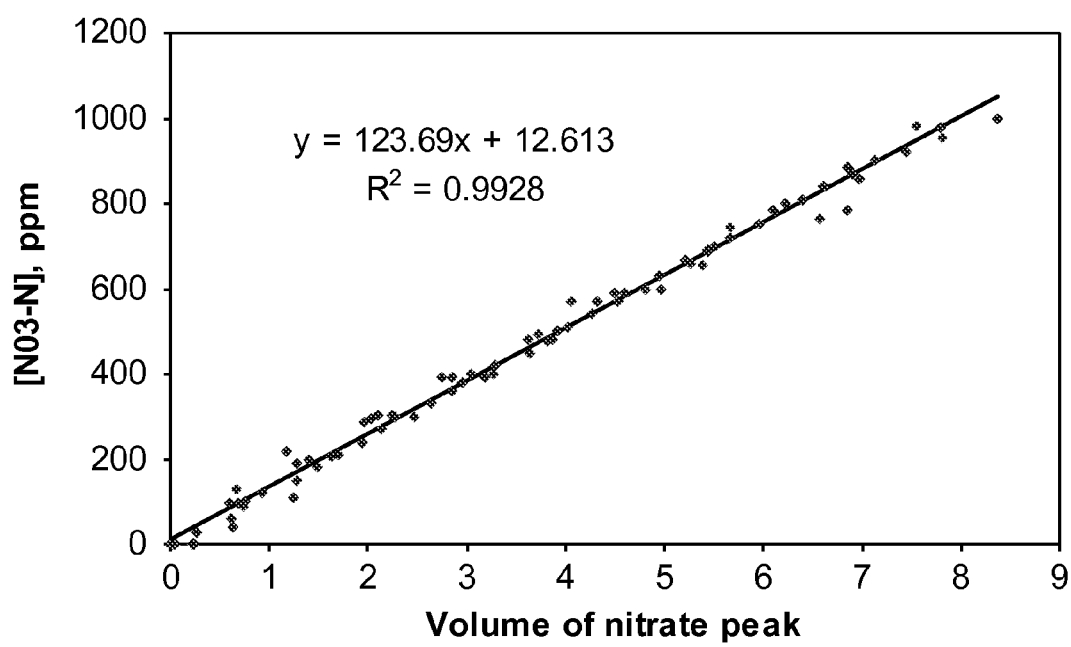
FIG. 4 shows a plot of nitrate concentration versus volume of nitrate peak for the five noncalcareous soils from Linker et al.; the standard error was 24.4 ppm $NO_3^-N$; the coefficient of determination, $R^2$, was 0.99

Referring now to FIGS. 4 and 5, strong linear correlations between wavelet deconvoluted nitrate peak volumes and nitrate concentrations were found. The values for $R^2$ were 0.86 and higher, with standard errors less than 112 ppm $NO_3$—N (nitrate concentrations range in samples: 0-1000 ppm $NO_3$—N). FIG. 4 is plot of nitrate content versus nitrate peak volume for the five non-calcareous soils pooled together while FIG. 5 shows the three calcareous soils pooled together. The standard error for the five non-calcareous soils was 24.4 ppm $NO_3$—N while that for the three calcareous soils was 112.0 ppm $NO_3$—N.

The reason for the larger standard error in the calcareous soils can be explained as follows. The nitrate peak volumes for the calcareous soils were nearly an order of magnitude less than those for the noncalcareous soils. This is because the large carbonate peak found at approximately 1450 $cm^{-1}$ tended to overshadow with the smaller nitrate peak located around 1370 $cm^{-1}$. Rather than having a clearly defined nitrate peak in the absorbance spectra, the response due to nitrate now showed up as a shoulder on the much larger carbonate peak, as shown in FIG. 6. This, in turn, caused the nitrate peak to both be shifted to a lower wavenumber and to become smaller in magnitude. Separating these peaks in the third dimension (scale) using wavelet analysis still resulted in peak overlap issues that caused problems when estimating peak volumes, as shown by the relatively poor correlation coefficient for the three calcareous soils ($R^2$=0.86) compared to the correlation coefficient for the five noncalcareous soils ($R^2$=0.99). Pooling the calcareous and noncalcareous data together resulted in poor correlation, due to the significantly different slopes in the data from FIGS. 4 and 5. This would suggest that separate calibration equations depending on the soil carbonate content may be needed for correlating wavelet decomposed peak volumes to nitrate concentrations. However, this situation was subsequently overcome by determining a second wavenumber to account for carbonate content of soil, as described below.

The split plot experiment was analyzed using Statistical Analysis Software (SAS, 2001), which revealed a significant effect ($\alpha$=0.05) due to soil type and none due to nitrate source (fertiliser). The homogeneity of variance assumption was verified by Hartley's Test (Milliken and Johnson, 1992). Note that the error structure of this model required that the main factor—soil type, be tested against the main plot error and the subfactor—fertilizer type, be tested against the experimental error Compared to the laboratory experiments conducted, the range of nitrate concentrations for the field plots (0-140 ppm $NO_3$—N) was significantly less. As with the previous experiments, the wavelet decomposed nitrate peak volume for each sample (average of 10 subsamples) was correlated to nitrate concentration. Ten subsamples were used as a compromise between reduced measurement error and workload required to deal with that many subsamples (The coefficient of variation of all the samples varied from 2% to 10%).

FIG. 7 illustrates a correlation graph for all six clay plots pooled together for both fertilizers is shown, and FIG. 8 shows a graph for all loam plots pooled together for both fertilizers.

FIG. 7 indicates a possible nonlinear relationship between nitrate peak volume and nitrate concentration. Fitting a quadratic to the data resulted in a $R^2$-value of 0.97 and standard error of 5.6 ppm $NO_3$—N. A linear regression line was plotted, however, to compare regression equations among the two soil types. In both cases, relatively high correlation values ($R^2$=0.93 for clay and 0.96 for loam) and low standard errors (9.5 and 5.8 ppm $NO_3$—N, respectively) were obtained. The slightly larger range of nitrate concentrations and nonlinear trend for the clay plots were likely the reasons why the standard error was larger. Even though the prediction capabilities looked promising, the slopes of the correlation lines were significantly different. Pooling the data from FIGS. 7 and 8 together and fitting a linear trendline resulted in a $R^2$-value of 0.78 and standard error of 15.4 ppm $NO_3$—N.

Soil spectra from the field experiments and from Israel were used to study the effects of using a limited number of wavenumbers on soil analysis. Several wavenumbers in the 1300 to 1400 $cm^{-1}$ range were investigated for correlating the absorbance values at these locations to nitrate contents. Referring to FIGS. 9 and 10, one can see that there is an interference problem with the peak around 1400 $cm^{-1}$. The wavelet decomposed plot in FIG. 10 shows that the nitrate peak and interfering peak (most likely due to carbonate) are separated in the scale (frequency) dimension, with the nitrate peak occurring at scale 3 and the interfering peak at scale 2.

FIG. 11 illustrates a 2-D representation of FIG. 10 for scales 2 and 3 including two different concentrations of nitrate in soil pastes. The curve due to carbonate (scale 2) crosses the horizontal axis at approximately 1350 $cm^{-1}$ for all samples. Therefore at this location, the influence from the interfering peak at 1400 $cm^{-1}$ is virtually nonexistent and represents the most promising location for predicting nitrate content with minimal interference. By locating the zero crossover point where interfering components have little or no absorption, we are able to avoid most of the interfering effects by using absorbance values and corresponding derivatives at these zero crossover points.

Plots of nitrate concentration vs. absorbance at 1350 $cm^{-1}$ for Capay clay and Yolo loam soils are shown in FIGS. 12 and 13. The Capay clay soils gave a $R^2$-value of 0.97 and standard error of 6.3 ppm $NO_3$—N. For the Yolo loam soil spectra, the $R^2$-value was 0.98 and standard error was 3.6 ppm $NO_3$—N. Perhaps, what's more important for these two plots is that the correlation lines have similar slope and intercept values. Pooling the data from these two plots together gave a $R^2$-value of 0.95 and standard error of 7.4 ppm $NO_3$—N. Out of the 47 spectra available (note that each point on the plots is an average of 10 spectra), 24 were randomly chosen to develop a calibration line and the remaining 23 spectra were used as validation. The calibration plot resulted in a standard error of 8.2 ppm $NO_3$—N and the validation plot a standard error of 6.2 ppm $NO_3$—N.

Similar procedures were used for the soils of the Israel lab test, and it was found that the calibration equations of nitrate concentration versus absorbance at 1350 $cm^{-1}$ for the five noncalcareous soils were both similar to each other, as well as to the equations developed from the field spectra. In addition, the slopes of the calibration equations for the three calcareous soils were similar to the slopes for the noncalcareous and field soils. However, the intercept values for the noncalcareous soils were found to differ both from each other and from the calcareous and field soils. There are several reasons for the different intercept values among the three groups of spectra: 1) The large peak at approximately 1450 $cm^{-1}$ (FIG. 6) tended to deform the much smaller nitrate peak located at approximately 1370 $cm^{-1}$; 2) difference in spectrometers used in the two studies. In particular, the Israel lab soils were tested with a deuterated triglycine sulphate (DTGS) detector while a MCT detector was used in the loom and clay soils; and 3) differences in moisture content of soil pastes (e.g. 1:1 weight basis pastes in field samples, whereas Israel lab samples used varying moisture contents).

Due to these intercept differences, a method based on indicator variables was used to pool all the data into one calibration plot. There were four distinct sets of soil spectra: one set for each of the three calcareous soils from Israel, one set for both the noncalcareous soils from Israel, and one for the field soils. The four distinct calibration lines were combined into one equation by using indicator variables for each of the three sets of soil spectra.

FIG. 14 shows a calibration plot of nitrate concentration versus absorbance at 1350 cm$^{-1}$ for the ten soils pooled together. The resulting value for $R^2$ was 0.98 and the standard error was 40 ppm $NO_3$—N. It was found that the intercept value for each of the three sets of spectra correlated to the absorbance at 1500 cm$^{-1}$, which is possibly related to organic and/or carbonate amount(s) in the soil. Therefore, a multiple linear regression procedure was used to develop a calibration equation based on the absorbance values at 1350 cm$^{-1}$ and 1500 cm$^{-1}$. This calibration equation resulted in a $R^2$-value of 0.98 and standard error of 45 ppm $NO_3$—N.

Wavelet analysis was the primary tool used to locate the wavenumber at which nitrate could be predicted with minimal influence from other components. Even though wavelet analysis proved to be able to predict nitrate contents reasonably well, the advantages of using a single absorbance value may be more practical in terms of developing a real-time soil nitrate sensor. Wavelet analysis uses a continuum of absorbance values which probably requires a spectrometer to obtain. As explained earlier, with a limited number of wavebands a tunable diode laser or IR light source with filters could suffice.

In general, four absorbance values are obtained. This is because besides the absorbance values at 1350 cm$^{-1}$ and 1500 cm$^{-1}$, two more are used for baseline correction. The range of these values would typically be limited from approximately 1300 cm$^{-1}$ to approximately 1550 cm$^{-1}$ to achieve the results described herein.

(d) Conclusions

The fundamental nitrate peak due to $v_3$ is the most promising for determining nitrate contents from soil pastes with low nitrate concentrations, and all the results presented were based on this peak. A major obstacle for accurate nitrate prediction appears to be the interfering peak located at approximately 1400 cm$^{-1}$, most likely due to carbonate. A signal processing method called wavelet analysis was successively used to decompose soil spectra into components corresponding to nitrate and other molecules.

Correlating nitrate concentrations with wavelet decomposed nitrate peak volumes resulted in high $R^2$-values (0.99 for noncalcareous soils, 0.85 for calcareous soils) and relatively low standard errors. The noncalcareous and calcareous calibration equations contained significantly different slopes. Therefore, pooling the two different soil sets together resulted in poor predictive ability (high standard error). Experiments conducted with field soils (0 to 100 ppm $NO_3$—N) showed promising results ($R^2$>0.93 and standard error<9.5 ppm $NO_3$—N). The regression lines produced by plotting the nitrate concentrations vs. wavelet decomposed nitrate peak volumes for the field soils appeared to depend on the soil type, indicating that site specific calibration would be needed.

Using absorbance values at a limited number of wavebands provided better predictive abilities for nitrate contents compared to wavelet analysis. Standard errors as low as 3.6 ppm $NO_3$—N were obtained for field experiments and would suffice for precision farming applications. What's more important is that a universal calibration equation was developed based on ten different soils. This equation used absorbance values at 1350 cm$^{-1}$ and 1500 cm$^{-1}$ to predict nitrate. Using absorbance values rather than wavelet decomposed values to predict nitrate contents is better suited toward development of a real-time soil nitrate sensor.

3. Experiment #2

An objective of this experiment was to investigate the applicability of a nitrate calibration equation developed using FTIR/ATR spectroscopy to predict nitrate concentrations in a grower's field. A further objective was to investigate the applicability of a fixed-filter spectrometer (e.g. rugged and inexpensive—without moving lenses or mirrors) capable of being used in a field environment for determining soil constituents such as nitrate, phosphorus, and organic matter content.

(a) Test Setup

Four fields were used, having the following soil types: Yolo loam, Capay clay, Rincon silty clay loam, and Sycamore silty clay loam. A repeated-measures approach was followed in which soil samples were obtained over four sampling periods. These sampling periods were chosen to represent the variation in nitrate contents the tomato plants were exposed to during a critical, approximately month-long growing period, and thus the range of nitrate contents of interest to growers.

A pre-plant application of 8-24-6 fertilizer was administered at a rate of approximately 19 kg/ha (17 lbs/acre), after which soil samples were collected. Approximately a week later, samples were again collected. Then, a post-emergence application of UN-32 (32% N) was applied at the rate of about 168 kg/ha (150 lb/acre), followed by two more sampling periods. Five samples were collected from each field for each of the four time periods, and each sample was split into three subsamples. The soil samples were oven-dried at 55° C. (131° F.) for 48 hours. Then the samples were ground, sieved (75 µm), and finally mixed with distilled water on a 1:1 mass basis to form a paste. The pastes were stored in a refrigerator at 4° C. for approximately one day, after which mid-IR spectra were collected. Selected extracts were sent to an analytical laboratory for nitrate analyses where a flow injection analysis technique was used. The nitrate concentrations for these soils varied from approximately 14 to 189 ppm $NO_3$—N.

A portable mid-IR variable filter array (VFA) spectrometer, manufactured by Wilks Enterprise, was used to obtain mid-IR spectra of field soil pastes. As with the laboratory-based spectrometer described in Experiment 1, this portable spectrometer utilized the ATR technique. The infrared radiation was provided by an elongated pulsating source and directed into a zinc-sulfide crystal where it reflected back and forth ten times before entering a linear variable filter.

The filter was attached to a pyroelectric detector array consisting of 64 elements. This spectrometer provided for a continuous range of absorbance values to be collected in the 880 to 1684 cm$^{-1}$ range with a resolution of approximately 12 cm$^{-1}$. A sapphire coating was applied to the crystal in order to prevent damage by soil particles. Furthermore, due to the filter-based setup, this spectrometer contains no moving parts and no optical path exposed to the air making it suitable for use in a field environment.

Each sample was divided into 10 subsamples and the spectrum of each subsample was obtained individually. Soil solutions were poured over the crystal and the ATR spectra were measured with 30 scans per sample. Since equal weights of dry soil and distilled water were used to create each paste, the soil spectra were corrected for moisture by taking the negative logarithm of the ratio of soil sample and background (water) single beam spectra. The spectra were smoothed with a 10-point cubic function using the WinFIRST software. A 2-point baseline correction procedure, similar to that described above in Experiment 1, was used to facilitate comparison of different spectra.

(b) Analysis of Soil Spectra

Preliminary analyses were performed with spectra collected with a filter-based mid-IR spectrometer. Calibration equations were developed to predict soil nitrate, phosphate, and humic acid. FIG. 15 compares spectra obtained from both a FTIR laboratory-based and filter-based spectrometers for a field soil sample containing 25 ppm $NO_3$—N. These spectra were smoothed and corrected for both water and baseline according to the procedures detailed in FIG. 2.

As shown in FIG. 15, the filter-based spectrometer provided similar response compared against the traditional FTIR laboratory-based spectrometer used in Experiment 1. The low resolution of the filter-based spectrometer compared to the lab-based FTIR spectrometer led to a higher signal to noise ratio in the area where the nitrate peak exists. However, with the lower resolution, shoulders and small features attributable to small concentrations of nitrate and other molecules were much more difficult to distinguish in the filter-based spectra.

FIG. 16 shows an exemplary method 50 of generating a calibration equation for detecting nitrate composition in a soil sample with an IR instrument. After correction for soil moisture, a two-point baseline correction is applied to each spectrum at step 56. Two wavenumbers are selected for fitting a line between minimums located at approximately 1300 $cm^{-1}$ and 1500 $cm^{-1}$ (see FIG. 9 and adjusting the slope of this line to be zero).

A wavelet analysis is then performed at step 58 to deconvolute the complex two-dimensional soil spectra into three-dimensional plots showing peaks corresponding to carbonate, nitrate, organic materials, and water. From there a nitrate peak may be identified to select a wavenumber at step 60 from which the volume of the nitrate peak is calculated. In addition, a second point is located at step 62 that corresponds to a wavenumber used to correct for any carbonate peak present in the soil. At this point, interference from carbonate peak is at a minimum, and the wavenumber corresponds to absorbance from nitrate alone, and not influenced by carbonate or other components in the soil. With spectra as shown in FIG. 15, the nitrogen peak corresponds to a wavenumber of 1500 $cm^{-1}$, whereas the point having minimal interference from the carbonate peak corresponds to a wavenumber of 1300 $cm^{-1}$.

A multiple-wavenumber model was developed based on the above wavelet analysis to correlate the measured absorbance values to a predicted nitrate concentration, and is defined in Equation 6:

$$NO_3-N(ppm)=26387 A_{1350}-8114.1 A_{1500}-20.5 \quad (6)$$

where $NO_3$—N is the nitrate concentration, and $A_{1350}$ and $A_{1500}$ are the ATR absorbance values from the two-point baseline—and water corrected spectra of the soil paste at 1350 $cm^{-1}$ and 1500 $cm^{-1}$, respectively.

FIG. 17 shows the calibration plot developed based on pooling soil mid-IR FTIR/ATR spectra from 14 different soils together. FIG. 18 is a validation plot based on 40 soil samples for all soil sets pooled together, comparing the actual nitrate content with the predicted content as calculated from Equation 6.

The standard errors of calibration and validation were 41.8 ppm and 40.1 ppm $NO_3$—N, respectively. Note that the large standard error of about 40 ppm should be interpreted in terms of the higher range (0 to 1200 ppm) used in this test. Over a more practical range of 0 to 200 ppm that is common in production agriculture, the standard was about 8 ppm These results show that nitrate can be predicted for 14 different soils using a single equation based on absorbance values at 1350 and 1500 $cm^{-1}$. Including only the California soils with nitrate concentrations typical of those found in agricultural fields (0 to 150 ppm $NO_3$—N) in the analysis resulted in $R^2$ value of 0.95 and standard error of approximately 8 ppm $NO_3$—N.

The samples used for the nitrate experiments were the same ones used in the FTIR/ATR calibration equation. As stated earlier, the range of nitrate concentrations was from 14 to 189 ppm $NO_3$—N.

(c) Nitrate Results for Filter-Based Spectrometer

As with the spectra obtained from the laboratory-based spectrometer, absorbance values at 1350 $cm^{-1}$ from the water- and baseline corrected spectra were correlated with nitrate concentrations for tests conducted using the filter-based portable spectrometer. FIG. 19 illustrates a calibration plot for the four Button and Turkovich fields. The $R^2$-value was 0.72 and standard error was 30.3 ppm $NO_3$—N. These predictive results are not as accurate compared to those obtained from the laboratory-based FTIR spectrometer and the standard error is much higher than desired. This may be due to the poorer resolution of the filter-based spectrometer compared with the laboratory-based spectrometer. The resolution of the filter-based spectrometer (12 $cm^{-1}$) is three times higher than the FTIR spectrometer used (4 $cm^{-1}$). The response due to nitrate shows up as a small shoulder in the absorbance spectra and is overshadowed by the nearby carbonate peak.

As shown in FIG. 15, the three bumps or peaks in the laboratory-based spectra get smoothed together in the filter-based spectra and result in one peak and a small shoulder. Carbonate concentrations were not determined, so variations in carbonate or organic matter amounts among the fields will affect the peak height and shape, as explained earlier. Another reason for the poorer results is due to the different optical setup, infrared source, and detector used by the filter-based spectrometer as compared with the FTIR spectrometer used. Small differences in spectral characteristics have a large influence on the location and magnitude of the nitrate response.

A third reason may be due to detection limit or threshold of the filter-based spectrometer. All but one of the fields contained nitrate concentrations less than 60 ppm $NO_3$—N only. Two fields contained nitrate concentrations less than 25 ppm $NO_3$—N for all four time periods. The correlation obtained may have resulted because the detection limit of the pyroelectric detector may be on the order of 20 or 30 ppm $NO_3$—N. The detection limit of the MCT detector used in the FTIR laboratory spectrometer is more than an order of magnitude higher than that of the pyroelectric detector used in the filter-based spectrometer. Referring to FIG. 19 and ignoring the two fields in which all the samples were less than 25 ppm $NO_3$—N, the $R^2$-value increased to 0.91.

In one embodiment, detection of the filter-based spectrometer may be improved by adding a small amount of nitrate or booster to each sample before obtaining the spectra. Assuming the nitrate concentration of each sample is known before adding the booster, mixing in additional nitrate may bring the total amount into a region where a strong linear correlation exists. Referring to FIG. 19, this region appeared to be in the 40 to 180 ppm $NO_3$—N range. Based on this hypothesis, 50 ppm $NO_3$—N in liquid state was added to samples from two of the Button and Turkovich fields which contained nitrate concentrations less than 30 ppm $NO_3$—N. FIG. 20 is a plot of nitrate concentration vs. absorbance at 1350 $cm^{-1}$ for all samples from the four Button and Turkovich fields, including the two fields with the nitrate boosters added.

Note that both the $R^2$-value and the standard error decreased. Boosting selected data did bring the four samples from another field into the linear region. However, there still exists a field (field 19) indicated by the four points circled in FIG. 20 (each point represents an average for each of the four time periods) where the nitrate concentrations for all four time periods did not fall within the linear range. Pooling the data from three of the fields together and ignoring the samples from field 19 gave an $R^2$-value of 0.88.

FIG. 21 shows spectra for two samples from both of the fields where a 50 ppm $NO_3$—N boost was applied. Although both spectra FIG. 21 represent approximately the same nitrate concentration, they are very different. The absorbance values at 1350 $cm^{-1}$ are significantly different and lead to poor correlation results for field 19 as shown in FIG. 20. The cause of this difference is most likely related to the spectrometer setup used. Note that these same samples were collected and analyzed with the FTIR spectrometer, and the FTIR spectra were similar for all four fields, depending on the nitrate concentrations. Therefore, factors such as carbonate and organic matter amounts are most likely not the cause of these differences. Since no other component analyses were performed besides nitrate analysis, organic matter and carbonate amounts were not known.

A stepwise multiple linear regression procedure was used to determine the existence of other absorbance values that can be used to predict nitrate. SAS proc reg (SAS, 2001) with both stepwise selection and maximum $R^2$-value (maxr) selection options were used to select the optimum wavenumbers from a total of 64 for predicting nitrate contents. The stepwise selection procedure checks the significance of the variable entered as well as all the variables in the model. With the maximum $R^2$-value technique, all possible combinations of absorbance values are regressed against nitrate content and the model with the highest $R^2$-value is selected as the best. The choice of the optimum model depends on the number of variables, $R^2$-value, and standard error, which can be used to predict nitrate concentrations with higher accuracy. Table 3 shows models derived from using SAS on field soil spectra obtained using the filter-based spectrometer. The spectra were all smoothed and corrected for water and baseline.

As shown in Table 3, a one-term model based on the water- and baseline-corrected absorbance at 1399 $cm^{-1}$ resulted in a standard error of 25 ppm $NO_3$—N. While slightly higher than desired for precision farming applications, this data shows promise for the use of the filter-based spectrometer for the purpose of nitrate prediction.

A plot of predicted vs. actual nitrate concentration for this one-term model is shown in FIG. 22. The reason that 1399 $cm^{-1}$ provided for better predictive abilities than 1350 $cm^{-1}$ can be seen in FIG. 15. As explained earlier, the poorer resolution of the filter-based spectrometer compared with the laboratory-based FTIR spectrometer resulted in the response due to nitrate and carbonate to show up as basically one peak located in the 1390 to 1400 $cm^{-1}$ region. Moving to a two-term model resulted in a $R^2$-value increase from 0.81 to 0.94 and a decrease in standard error to less than 15 ppm $NO_3$—N.

Although these spectra were collected in a laboratory setting, the versatility of the filter-based spectrometer allows for analysis to be performed in a field environment, provided the necessary soil processing can be accomplished. The three- and four-term models afforded for additional improvements in $R^2$-values and standard errors, as expected. However, the use of more absorbance values increases the complexity and decreases the robustness of the model as the independent variables tend to model the error in the model rather than actual variation.

Thus, the foregoing data suggests that there is a detectable response due to nitrate with a filter-based spectrometer. Due to different optics, detector, and resolution, it is not surprising that the spectral characteristics from the filter-based spectrometer are discernable from those obtained from the FTIR spectrometer used. With the limited spectra available, stepwise regression procedures were used to develop models to predict nitrate concentration with prediction errors less than 15 ppm $NO_3$—N. These results also indicate that some modification of the filter-based spectrometer may make it better suited for detecting low nitrate concentrations.

(d) Phosphate Detection Results for the Filter Based Spectrometer

Phosphate, in the form of $NaH_2PO_4$, was mixed with distilled water to give concentrations of approximately 0 to 230 ppm $PO_4$—P. These phosphate solutions were then added to dry soil samples on a 1:1 weight basis, as was done for the nitrate experiments explained earlier. The phosphate was extracted from the soils using 0.5 M $NaHCO_3$ using a modified form of the Olsen-P method. The filter-based spectra of these extracted samples were then obtained.

As shown in FIG. 23, an absorbance peak clearly exists at approximately 1120 $cm^{-1}$. It should be noted that the plot in FIG. 23 is based on large concentrations of phosphate in water only. When phosphate is added to soil it tends to be fixed by metals such as aluminum and iron in acidic conditions and calcium in alkaline conditions. This was seen in the soil spectra containing phosphate ranging in concentration from 0 to 230 ppm $PO_4$—P, as shown in FIG. 24.

The large peak at approximately 1020 $cm^{-1}$ is due to the silicate particles in the soil. The slight variations in the spectra around this location made correlation to phosphate concentrations poor. The peak at approximately 1380 $cm^{-1}$ is most likely due to $HCO_3^-$, since this was used as the extracting agent. Although the phosphate concentrations varied by approximately 230 ppm, there was no evidence of significant differences in the spectra in FIG. 24. Note that derivative spectra were investigated as well, but did not yield promising results related to phosphate concentrations.

It was found that using simple linear regression with one wavenumber on the filter-based soil spectra had limited success based on a limited number of experiments. FIG. 25 is a multiple linear regression calibration plot for some preliminary phosphate experiments conducted with Yolo loam soil. As with the nitrate experiments, the spectra were baseline- and water-corrected.

The two wavenumbers derived from the wavelet analysis to predict phosphate $cm^{-1}$ were 1037 and 1508 $cm^{-1}$. The absorbance at 1037 $cm^{-1}$ is close to the 1100 $cm^{-1}$ peak shown in FIG. 23 but is largely influenced by the large silicate peak shown in FIG. 24. Although the concentrations in FIG. 25 were slightly larger than typically used in agricultural fields, the standard error under 24 ppm $PO_4$—P for this rugged filter-based spectrometer showed promise.

(d) Organic Matter Detection Results for the Filter Based Spectrometer

Organic matter was added in the form of humus to dry soil samples. Humus was obtained from the local hardware store, dried, and then mixed with soil samples to give humus concentrations in the range of approximately 0 to 7%. Distilled water was added to create a 1:1 paste, as before. Pure humus was sent to an analytical laboratory for analysis and the organic matter concentration was found to be 30% based on the loss-on-ignition method (Nelson et al., 1996). Also, the soil samples used for the experiments were analyzed for percent organic matter using the same procedure.

Similar to the phosphate experiment, limited testing was performed to determine if the filter-based spectrometer showed promise for detecting humus in soil samples. As was found for the phosphate spectra, simple linear regression was not highly effective, and multiple linear regression techniques were explored.

FIG. 26 illustrates an organic matter calibration plot developed using multiple linear regression for experiments consisting of adding humus to three different fields. The % organic matter was correlated to two absorbance values selected using the stepwise procedure in SAS explained earlier. Prior to wavelet analysis, the spectra were baseline and water corrected.

The $R^2$-value was 0.95 and standard error was 0.25%. The absorbance values used to develop the above calibration plot were located at wavenumbers of 1383 $cm^{-1}$ and 1452 $cm^{-1}$. The 1383 $cm^{-1}$ location could be due to nitrate and/or carbonate. The results shown in FIG. 26 indicate that the filter-based spectrometer showed promise for predicting organic matter concentrations as well as phosphate and nitrate.

4. Conclusion

A nitrate calibration equation developed using FTIR/ATR spectroscopy was successfully used to predict nitrate concentrations in 14 different soils. For large nitrate concentrations (up to 1000 ppm $NO_3$—N), the standard error was approximately 40 ppm $NO_3$—N. Based on smaller nitrate concentration range (0 to 150 ppm $NO_3$—N), the standard error was approximately 8 ppm $NO_3$—N.

A rugged filter-based spectrometer was investigated for the purpose of developing a calibration equation to predict nitrate concentration based on nitrate amounts typically found in agricultural fields (0 to 189 ppm $NO_3$—N), and an absorbance peak attributable to the nitrate molecule was identified.

Correlating absorbance at 1350 $cm^{-1}$ to nitrate concentration for each sample resulted in an $R^2$-value of 0.72 and standard error of 30.3 ppm $NO_3$—N. A multiple linear regression model was developed based on the absorbance values at 992 $cm^{-1}$ and 1399 $cm^{-1}$ for these four soils resulting in an $R^2$-value of 0.94 and standard error of 14.9 ppm $NO_3$—N.

The filter-based spectrometer capabilities for developing a calibration equation useful for predicting phosphate in soils. Based on the preliminary results, a calibration equation was developed using soil samples spiked with phosphate ranging in concentration from 0 to 230 ppm $PO_4$—P. The $R^2$-value was 0.96 and the standard error was 23.7 ppm $PO_4$—P.

The filter-based spectrometer also capabilities for predicting organic matter in soils. A limited number of experiments were performed, and based on a range of organic matter from 0 to approximately 6%, a multiple linear regression calibration equation was developed resulting in an $R^2$-value of 0.95 and a standard error of 0.25%.

Although the description above contains many details, these should not be construed as limiting the scope of the invention but as merely providing illustrations of some of the presently preferred embodiments of this invention. Therefore, it will be appreciated that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." All structural, chemical, and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for."

TABLE 1

Soil texture and $CaCO_3$ concentrations for soils from Israel.

| Soil name | Soil type | % Clay | % Silt | % Sand | % $CaCO_3$ Concentration |
|---|---|---|---|---|---|
| Beit Shean | Calcareous clay | 55 | 22 | 23 | 47 |
| Bsor | Loam | 15 | 9 | 76 | 13 |
| Shaalabim | Clay | 54 | 19 | 27 | 9 |
| H1 | Sandy loam | 1 | 6 | 93 | 0 |
| H2 | Sandy loam | 1 | 5 | 94 | 0 |
| Germany | Loam | 24 | 23 | 53 | 0 |
| Columbia | Clay | N/A | N/A | N/A | 1 |
| Tourba | Peat | N/A | N/A | N/A | 0 |

TABLE 2

Data for clay and loam soils.

| Soil type | pH | $CO_3^{2-}$ (ppm) | $HCO_3^-$ (ppm) | $NO_3^-$ (ppm) |
|---|---|---|---|---|
| Capay clay | 5.9–6.3 | <3 | 48.8–85.4 | 5.0–140.0 |
| Yolo loam | 6.8–7.0 | <3 | 79.3–109.8 | 10.1–96.7 |

TABLE 3

Results of using stepwise regression procedure for filter-based spectrometer.

| Wavenumber(s) ($cm^{-1}$) used | $R^2$-value | Standard error (ppm $NO_3$—N) |
|---|---|---|
| 1399 | 0.81 | 25.0 |
| 992, 1399 | 0.94 | 14.9 |
| 992, 1037, 1399 | 0.95 | 13.5 |
| 1010, 1046, 1248, 1416 | 0.99 | 7.8 |

What is claimed is:

1. A method for determining nitrate concentration of in a soil sample, comprising:
    obtaining, with a spectrometer, a mid-infrared attenuated total reflectance spectra of the soil sample;
    identifying, from the reflectance spectra, a first wavenumber corresponding to a nitrate peak in the soil spectra;
    identifying, from the reflectance spectra, a second wavenumber to correct for interference of carbonate in the soil spectra; and
    predicting nitrate concentration in the soil sample using said first and second wavenumbers.

2. A method as recited in claim 1, wherein the first wavenumber comprises approximately 1300 $cm^{-1}$ to approximately 1350 $cm^{-1}$.

3. A method as recited in claim 2, wherein the first wavenumber comprises approximately 1350 $cm^{-1}$.

4. A method as recited in claim 2, wherein the second wavenumber comprises approximately 1500 $cm^{-1}$.

5. A method of correlating FTIR ATR soil spectra to a nitrate concentration, comprising:

obtaining, with a spectrometer, FTIR ATR soil spectra from a plurality of soil samples of different soil types; and pooling absorbance data from one or more selected wavelengths of each sample into a calibration equation.

6. A method as recited in claim 5, wherein pooling absorbance data comprises:

analyzing the soil spectra to separate a nitrate peak from a carbonate peak; and identifying a wavenumber at the nitrate peak and calculating a volume of the nitrate peak.

7. A method as recited in claim 6, wherein a wavelet analysis is performed to separate the nitrate peak from the carbonate peak.

8. A method as recited in claim 5, wherein the selected wavelengths comprise a value between approximately 1300 $cm^{-1}$ and approximately 1550 $cm^{-1}$.

9. A method as recited in claim 8, wherein a first selected wavelength comprises approximately 1350 $cm^{-1}$.

10. A method as recited in claim 9, wherein a second selected wavelength comprises approximately 1500 $cm^{-1}$.

11. A method for determining the concentration of a component in a soil sample, comprising:

obtaining, with a spectrometer, mid-infrared attenuated total reflectance spectra of the soil sample;

correlating a plurality of mid-infrared range absorbance values with a component concentration in soil; and determining component concentration from said absorbance values;

wherein said absorbance values do not form a continuous spectrum.

12. method as recited in claim 11, wherein the component comprises nitrate, and wherein one of the mid-infrared range absorbance values corresponds to a decomposed peak volume of nitrate.

13. A method as recited in claim 12, wherein said absorbance value comprises a value between approximately 1300 $cm^{-1}$ and approximately 1550 $cm^{-1}$.

14. A method as recited in claim 11, wherein the component comprises phosphorus, and wherein one of the mid-infrared range absorbance values corresponds to a peak corresponding to soil phosphorus content.

15. A method as recited in claim 14, wherein said absorbance value comprises a value between approximately 1000 $cm^{-1}$ and approximately 1550 $cm^{-1}$.

16. A method as recited in claim 15, wherein said absorbance value comprises a value between approximately 1037 $cm^{-1}$ and approximately 1508 $cm^{-1}$.

17. A method as recited in claim 11, wherein the component comprises organic matter, and wherein one of the mid-infrared range absorbance values corresponds to a peak corresponding to soil organic matter content.

18. A method as recited in claim 17, wherein said absorbance value comprises a value between approximately 1383 $cm^{-1}$ and approximately 1452 $cm^{-1}$.

* * * * *